(12) United States Patent
Chen et al.

(10) Patent No.: US 10,470,170 B2
(45) Date of Patent: *Nov. 5, 2019

(54) UPLINK CONTROL CHANNEL FOR LOW LATENCY COMMUNICATIONS

(71) Applicant: QUALCOMM Incorporated, San Diego, CA (US)

(72) Inventors: Wanshi Chen, San Diego, CA (US); Peter Gaal, San Diego, CA (US); Shimman Arvind Patel, San Diego, CA (US); Hao Xu, Beijing (CN); Juan Montojo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/174,102

(22) Filed: Oct. 29, 2018

(65) Prior Publication Data

US 2019/0069288 A1 Feb. 28, 2019

Related U.S. Application Data

(63) Continuation of application No. 15/191,460, filed on Jun. 23, 2016, now Pat. No. 10,129,859.

(Continued)

(51) Int. Cl.
*H04W 72/04* (2009.01)
*H04L 1/00* (2006.01)
(Continued)

(52) U.S. Cl.
CPC ....... *H04W 72/0413* (2013.01); *H04L 5/0048* (2013.01); *H04L 5/0053* (2013.01); *H04W 76/27* (2018.02); *H04L 5/0007* (2013.01)

(58) Field of Classification Search
CPC .......................... H04W 72/0413; H04W 76/27; H04L 5/0053; H04L 5/0048; H04L 5/0007

See application file for complete search history.

(56) References Cited

U.S. PATENT DOCUMENTS

2010/0165931 A1* 7/2010 Nimbalker ............ H04L 1/0028 370/329
2011/0170504 A1 7/2011 Xu et al.
(Continued)

OTHER PUBLICATIONS

European Search Report—EP19155070—Search Authority—The Hague—dated Mar. 1, 2019.

(Continued)

*Primary Examiner* — Kiet Tang
(74) *Attorney, Agent, or Firm* — Anthony R. Morris

(57) ABSTRACT

Methods, systems, and devices for wireless communication are described. A wireless device such as a user equipment (UE) or a base station may identify a set of resource element groups (REGs) for low latency communication, and each REG may include a portion of a different resource block (RB) of a set of RBs (e.g., a set of non-contiguous RBs). The device may then map an uplink control channel to the selected REGs and communicate on the uplink control channel accordingly. Reference signals may also be transmitted in the same RBs, and the REGs may be mapped around the resources used for reference signals. In some cases, multiple UEs may transmit uplink control data using the same resources using code division multiplexing (CDM) (e.g., if the control payload is relatively small). In other cases, multiple UEs may be frequency division multiplexed (FDM).

27 Claims, 15 Drawing Sheets

Related U.S. Application Data

(60) Provisional application No. 62/241,997, filed on Oct. 15, 2015.

(51) Int. Cl.
  *H04B 7/26* (2006.01)
  *H04W 56/00* (2009.01)
  *H04W 76/27* (2018.01)
  *H04L 5/00* (2006.01)

(56) References Cited

U.S. PATENT DOCUMENTS

| | | | |
|---|---|---|---|
| 2011/0200002 A1 | 8/2011 | Han et al. | |
| 2011/0310825 A1* | 12/2011 | Hu | H04L 5/0017 370/329 |
| 2012/0008516 A1* | 1/2012 | Liu | H04W 56/0045 370/252 |
| 2014/0036803 A1 | 2/2014 | Park | |
| 2014/0098780 A1 | 4/2014 | Kim et al. | |
| 2014/0105155 A1 | 4/2014 | Kim et al. | |
| 2014/0185560 A1 | 7/2014 | Kim et al. | |
| 2014/0247816 A1 | 9/2014 | Kim et al. | |
| 2014/0334328 A1* | 11/2014 | Tong | H04W 16/14 370/252 |
| 2015/0223263 A1* | 8/2015 | Soong | H04B 7/2606 370/315 |
| 2016/0295574 A1* | 10/2016 | Papasakellariou | H04L 1/0009 |
| 2016/0309510 A1 | 10/2016 | Wong et al. | |
| 2017/0111894 A1 | 4/2017 | Chen et al. | |

OTHER PUBLICATIONS

Huawei et al: "PUCCH ACK/NACK resource allocation for ePDCCH," 3GPP Draft; R1-123122, 3rd Generation Partnership Project (3GPP), Mobile Competence Centre ; 650, Route Des Lucioles ; F-06921 Sophia-Antipolis Cedex ; France vol. RAN WG1, No. Qingdao, China; Aug. 13, 2012-Aug. 17, 2012 Aug. 5, 2012 (Aug. 5, 2012), XP050661016, Retrieved from the Internet: URL:http://www.3gpp.org/ftp/tsg_ran/WG1_RL 1/TSGR1 70/Docs/ [retrieved on Aug. 5, 2012].

International Search Report and Written Opinion—PCT/US2016/048653—ISA/EPO—dated Nov. 8, 2016.

Texas Instruments: "Sounding Reference Signal in Support of Scheduling Request in E-UTRA," 3GPP Draft; R1-081364 SRSRS, 3rd Generation Partnership Project (3GPP), Mobile Competence Centre ; 650, Route Des Lucioles ; F-06921 Sophia-Antipolis Cedex ; France, vol. RAN WG1, No. Shenzhen, China; Mar. 27, 2008, Mar. 27, 2008 (Mar. 27, 2008), XP050109787, [retrieved on Mar. 27, 2008].

ZTE Corporation: "PUCCH Resource Allocation for ePDCCH," 3GPP Draft; R1-124818 PUCCH Resource Allocation for EPDCCH, 3rd Generation Partnership Project (3GPP), Mobile Competence Centre ; 650, Route Des Lucioles ; F-06921 Sophia-Antipolis Cedex ; France vol. RAN WG1, No. New Orleans. USA; Nov. 12, 2012-Nov. 16, 2012 Nov. 4, 2012 (Nov. 4, 2012), XP050663051, Retrieved from the Internet: URL:http:fjwww.3gpp.orgjftpjtsg ran/WG1 RL1/TSGR1 71/Docs/—[retrieved on Nov. 4, 2012], 3 pages.

\* cited by examiner

UPLINK CONTROL CHANNEL FOR LOW LATENCY COMMUNICATIONS

CROSS REFERENCES

The present Application for Patent is a Continuation of U.S. patent application Ser. No. 15/191,460 by Chen et al., entitled "UPLINK CONTROL CHANNEL FOR LOW LATENCY COMMUNICATIONS," filed Jun. 23, 2016, which claims priority to U.S. Provisional Patent Application No. 62/241,997 by Chen et al., entitled "UPLINK CONTROL CHANNEL FOR LOW LATENCY COMMUNICATIONS," filed Oct. 15, 2015, assigned to the assignee hereof, and each of which are hereby expressly incorporated by reference herein in their entirety.

BACKGROUND

The following relates generally to wireless communication and more specifically to uplink control channel configurations for low latency communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

In some cases, a wireless system may support low latency operations using subframes, symbol periods, or transmission time intervals (TTI) of different durations. Low latency communication may use communication techniques and formats that are similar to non-low latency communications. Low latency uplink control transmissions based on a non-low latency configuration may, however, result in inefficient management of wireless resources and increased implementation and operation costs.

SUMMARY

A wireless device such as a user equipment (UE) or a base station may identify a set of resource element groups (REGs) for low latency communication. Each REG of the set may include a portion of a different resource block (RB) of a set of RBs (e.g., a set of RBs that are non-contiguous in the frequency domain). The device may then map an uplink control channel to the selected REGs and communicate on the uplink control channel accordingly. Reference signals may also be transmitted in the same RBs, and the REGs may be mapped around the resources used for reference signals. In some cases, multiple UEs may transmit uplink control data using the same resources using code division multiplexing (CDM) (e.g., if the control payload is relatively small). In other cases, multiple UEs may be frequency division multiplexed (FDM), such that different UEs may transmit uplink control data using resources of different resources (e.g., different subcarriers) in the frequency domain.

A method of wireless communication is described. The method may include identifying a set of REGs, wherein each REG of the set of REGs comprises a portion of a respective RB of a set of RBs. The method may also include mapping an uplink control channel for a wireless communication link to the set of REGs and communicating on the uplink control channel using the set of REGs.

An apparatus for wireless communication is described. The apparatus may include means for identifying a set of REGs, wherein each REG of the set of REGs comprises a portion of a respective RB of a set of RBs. The apparatus may also include means for mapping an uplink control channel for a wireless communication link to the set of REGs, and means for communicating on the uplink control channel using the set of REGs.

Another apparatus is described. The apparatus may include a processor, memory in electronic communication with the processor, and instructions stored in the memory. The instructions may be operable to cause the processor to identify a set of REGs, wherein each REG of the set of REGs comprises a portion of a respective RB of a set of RBs. The instructions may also be operable to cause the processor to map an uplink control channel for a wireless communication link to the set of REGs, and communicate on the uplink control channel using the set of REGs.

A non-transitory computer readable medium for wireless communication is described. The non-transitory computer-readable medium may include instructions to cause a processor to identify a set of REGs, where each REG of the set of REGs comprises a portion of a respective RB of a set of RBs. The non-transitory computer-readable medium may also include instructions to map an uplink control channel for a wireless communication link to the set of REGs, and communicate on the uplink control channel using the set of REGs.

Some examples of the method, apparatuses, or non-transitory computer-readable medium as described herein may include operations, features, means, or instructions for identifying an offset associated with a user equipment (UE); and transmitting an uplink reference signal using the offset in each RB of the set of RBs. In some examples, the uplink reference signal may be transmitted during symbol periods that include the uplink control channel. In some examples, the uplink reference signal may be transmitted during symbol periods indicated by a base station. In some examples, the uplink reference signal may be associated with an uplink control channel, or an uplink shared channel, or both.

In some examples of the method, apparatuses, or non-transitory computer-readable medium as described herein, the set of REGs may be semi-statically configured according to an indication communicated using radio resource control (RRC) signaling. In some examples of the method, apparatuses, or non-transitory computer-readable medium as described herein, the set of REGs may be dynamically configured using an indication communicated in a downlink message. In some examples of the method, apparatuses, or non-transitory computer-readable medium as described herein, the set of RBs may be non-contiguous.

In some examples of the method, apparatuses, or non-transitory computer-readable medium as described herein, a waveform of the uplink control channel may include an orthogonal frequency division multiplexing (OFDM) waveform, a discrete Fourier transform spread OFDM (DFT-S-OFDM) waveform, or an interleaved frequency division multiplexing (IFDM) waveform.

Some examples of the method, apparatuses, or non-transitory computer-readable medium as described herein may include operations, features, means, or instructions for identifying a code division multiplexing (CDM) cover code, wherein communicating over the wireless communication link is based at least in part on the CDM cover code. In some examples, the CDM cover code comprises resource elements of two or more different subcarriers in a frequency domain, or resource elements of two or more different symbol periods in a time domain, or a combination thereof. Some examples may include operations, features, means, or instructions for determining a payload size of the uplink control channel, wherein identifying the CDM cover code is based at least in part on the payload size.

In some examples of the method, apparatuses, or non-transitory computer-readable medium as described herein, each REG of the set of REGs comprises a set of resource elements (REs) that comprise data interleaved with REs that comprise a reference signal, wherein the interleaving comprises alternating one of the REs that comprise data with one of the REs that comprise the reference signal during a symbol period of an RB of the set of RBs.

In some examples of the method, apparatuses, or non-transitory computer-readable medium as described herein, each REG of the set of REGs comprises a set of REs that comprise data interleaved with REs that comprise a reference signal, wherein the interleaving comprises alternating two of the REs that comprise data with one of the REs that comprise the reference signal during a symbol period of an RB of the set of RBs.

Some examples of the method, apparatuses, or non-transitory computer-readable medium as described herein may include operations, features, means, or instructions for identifying a quantity of REGs in the set of REGs based at least in part on a content of the uplink control channel.

In some examples of the method, apparatuses, or non-transitory computer-readable medium as described herein, communicating over the wireless communication link may include operations, features, means, or instructions for transmitting a reference signal and first data in a first REG of the set of REGs during a first symbol period; and transmitting second data in each RE of a second REG of the set of REGs during a second symbol period that follows the first symbol period.

Some examples of the method, apparatuses, or non-transitory computer-readable medium as described herein may include operations, features, means, or instructions for identifying a transmit antenna or a transmit port for each REG of the set of REGs.

In some examples of the method, apparatuses, or non-transitory computer-readable medium as described herein, the communicating may include operations, features, means, or instructions for transmitting a sounding reference signal (SRS) during a last symbol period of a transmission time interval that comprises the uplink control channel.

Some examples of the method, apparatuses, or non-transitory computer-readable medium as described herein may include operations, features, means, or instructions for identifying a first REG structure associated with a first UE and a second REG structure associated with a second UE; and receiving a first uplink reference signal from the first UE using the first REG structure in an RB of the set of RBs. Some examples may include operations, features, means, or instructions for receiving a second uplink reference signal from the second UE using the second REG structure in another RB of a set of RBs. In some examples the first REG structure and the second REG structure differ at least in one of a frequency offset, a number of REs for reference signals, or a CDM cover, or a combination thereof. Some examples may include operations, features, means, or instructions for receiving data or control information in each RE of an REG associated with the first UE in another RB during a second symbol duration, the set of REGs comprising the REG associated with the first UE.

DETAILED DESCRIPTION

Figure 1:
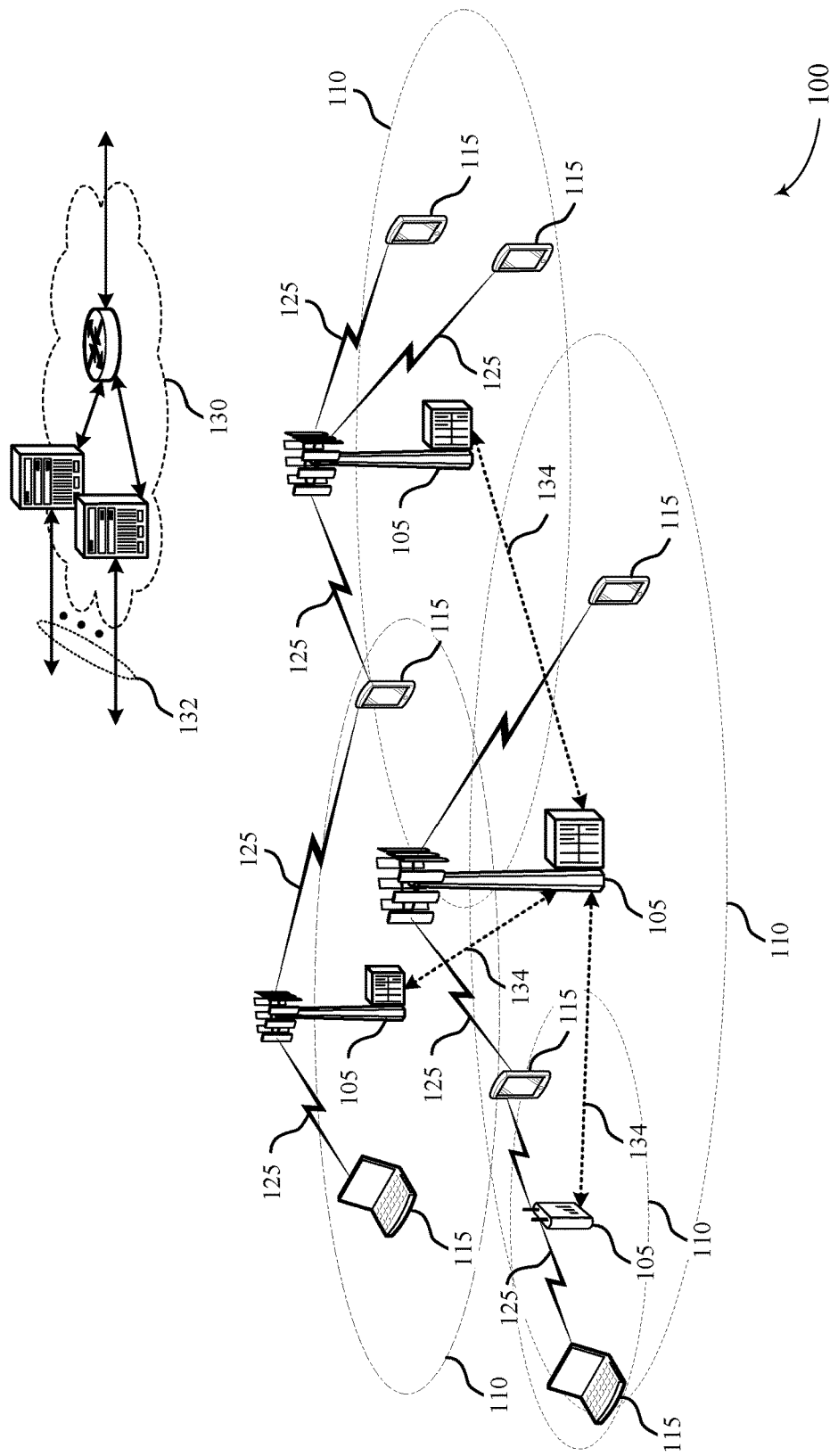
FIG. 1 illustrates an example of a wireless communications system that supports uplink control channel configurations for low latency communications in accordance with aspects of the present disclosure.

Some wireless communications systems may use a reduced or variable transmission time interval (TTI) duration, relative to other TTI durations used in the system, to reduce latency between downlink (DL) and uplink (UL) transmissions. Low latency communications may be characterized by shorter latency for hybrid automatic repeat request (HARQ) feedback and retransmissions, for example. Considerations relevant to uplink control channels may be different for these low latency communications than considerations motivating uplink control channel design for other, non-low latency communications. For instance, peak-to-average power ratio (PAPR), which may generally be a motivating concern in uplink control channel design, may be less significant in the context of low latency communications. Other factors, such as time diversity, spatial diversity, or HARQ payload size may be more significant considerations in some low latency deployments.

Multiple devices in systems that support low latency communications may thus communicate on radio frequencies by using an orthogonal frequency-division multiple access (OFDMA) scheme or non-single-carrier frequency division multiple access (non-SC-FDMA) for uplink (UL) transmissions. Use of OFDMA or other non-SC-FDMA schemes in the uplink may favorably accommodate time diversity, spatial diversity, or payload concerns. Low latency communication may coexist with other UL transmissions (e.g., UL transmissions sent according to different numerologies) in the same subframe or symbol period.

Different channel configurations may be used for orthogonal frequency division multiplexing (OFDM) UL control channel transmissions depending, for example, on a payload size of an uplink transmission. For example, for relatively small payloads, a first configuration may be associated with resource element groups (REGs) that are frequency distributed e.g., across resource blocks that are non-contiguous in the frequency domain) and may use code division multiplexing (CDM) for multiple UEs. This configuration may enable transmissions from different UEs to be multiplexed in the same resource elements (REs). Smaller payloads may thus allow for increased time diversity because control channels of several UEs may be multiplexed throughout an REG mapping that is applied to different symbol periods. An REG according to the first configuration may span 6 REs, where three of the REs may be used for reference signals (RS), and three of the REs may be used for UL control information or other data.

A second UL control configuration may use frequency division multiplexing (FDM) for multiplexing different UEs. This configuration may be associated with medium or large payloads and may provide for increased spatial diversity over a single-carrier frequency-division multiple access (SC-FDMA) scheme because, for instance, resource blocks that are non-contiguous in the frequency domain may be used. In some cases, the operating environment may determine the UL control configuration. For example, the second configuration may be used for channels where frequency diversity and aligned REG sizes are conducive to the configuration (e.g., the second configuration may be used opportunistically). An REG according to the second configuration may also span 6 REs, but two of the REs may be used for RS and four of the REs may be used for UL control information or other data.

Aspects of the disclosure introduced above are described below in the context of a wireless communication system. Specific examples then provide additional detail regarding the first and second UL control and REG configurations. Aspects of the disclosure are further illustrated by and described with reference to apparatus diagrams, system diagrams, and flowcharts that relate to uplink control channel for low latency communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. Wireless communications system 100 may support communication on an OFDM uplink control channel mapped to a set of REGs in which each REG is mapped to a portion of a different RB within a set of RBs.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, or the like. Some UEs 115 may support low latency communications using transmission time intervals (TTIs) that have a shorter duration relative to TTIs used by other UEs 115. UEs 115 that are configured for or capable of low latency communications may be referred to as low latency UEs 115, while other UEs 115 may be referred to as non-low latency UEs 115 or legacy UEs 115.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105. Various base stations 105 may be capable of low latency communications.

A frame structure may be used to organize physical resources (e.g., radio resources in the frequency domain and the time domain). A frame may be a 10 ms interval that may be further divided into 10 equally sized sub-frames. Each sub-frame may include two consecutive time slots. Each slot may include 6 or 7 OFDMA symbol periods. A resource element (RE) consists of one symbol period and one sub-carrier (a 15 KHz frequency range). A resource block (RB) may contain 12 subcarriers that are contiguous in the frequency domain and, for a normal cyclic prefix in each OFDM symbol period, 7 consecutive OFDM symbol periods in the time domain (1 slot), or 84 resource elements. Some resource elements may include DL reference signals (DL-RS). The DL-RS may include a cell-specific reference signal (CRS) and a UE-specific RS (UE-RS). UE-RS may be transmitted on the resource blocks associated with a physical downlink shared channel (PDSCH). The number of bits carried by each resource element may depend on the modulation scheme (e.g., the configuration of resource elements that may be selected during each symbol period). Thus, the more resource blocks that a UE receives and the higher the modulation scheme, the higher the data rate may be.

Downlink control information may be transmitted from a base station 105 to a UE 115 using a physical downlink control channel (PDCCH). PDCCH may carry downlink control information (DCI) in control channel elements (CCEs), which may consist of nine logically contiguous resource element groups (REGs), where each REG contains 4 resource elements (REs), for example. DCI may include information regarding DL scheduling assignments, UL resource grants, transmission scheme, UL power control, HARQ information, MCS, and other information. The size and format of the DCI messages can differ depending on the type and amount of information that is carried by the DCI. For example, if spatial multiplexing is supported, the size of the DCI message may be large compared to contiguous frequency allocations. Similarly, for a system that employs MIMO, the DCI must include additional signaling information. DCI size and format may depend on the amount of information as well as factors such as bandwidth, the number of antenna ports, and duplexing mode.

Uplink control information may be transmitted from a UE 115 to a base station 105 using a physical uplink control channel (PUCCH). PUCCH may be used for UL acknowledgements (ACKs), scheduling requests (SRs), channel quality indicators (CQI), and other UL control information. In some cases, a PUCCH may be mapped to a control channel defined by a code and two consecutive resource blocks. UL control signaling may depend on the presence of timing synchronization for a cell. PUCCH resources for SR and CQI reporting may be assigned (and revoked) through RRC signaling. In some cases, resources for SR may be assigned after acquiring synchronization through a random access channel (RACH) procedure. In other cases, an SR may not be assigned to a UE 115 through the RACH (i.e., synchronized UEs may or may not have a dedicated SR channel). PUCCH resources for SR and CQI may be lost when the UE is no longer synchronized.

In some cases, PUCCH is transmitted using single carrier frequency division multiple access (SC-FDMA), but in other cases OFDM or other multiplexing configurations may be used (e.g., for low latency communications). For low latency communications, PUCCH may also be organized according to REGs as described herein. Control channels for low latency communications (e.g., low latency PUCCH) may or may not be mapped to consecutive or contiguous RBs.

In some cases, wireless communications system 100 may utilize an enhanced CC (eCC), or more than one eCC. An eCC may be characterized by one or more features including: wider bandwidth, shorter symbol duration, shorter transmission time interval (TTI), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other component carriers (CCs), which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 μs). A TTI in eCC may consist of one or multiple symbols. In some cases, the TTI duration (that is, the number of symbols in a TTI) may be variable.

A UE 115 or a base station 105 may identify a set of REGs for low latency communication, where each REG may include a portion of a different RB of a set of RBs, wherein RBs of the set of RBs may be contiguous or non-contiguous. The device may then map an uplink control channel for to the selected REGs and communicate on the uplink control channel accordingly. Reference signals may also be transmitted in the same RBs, and the REGs may be mapped around the resources used for reference signals. In some cases, multiple UEs 115 may transmit uplink control data using the same resources using code division multiplexing (CDM) (e.g., if the control payload is relatively small). In other cases, multiple UEs may be frequency division multiplexed (FDM).

Figure 2:
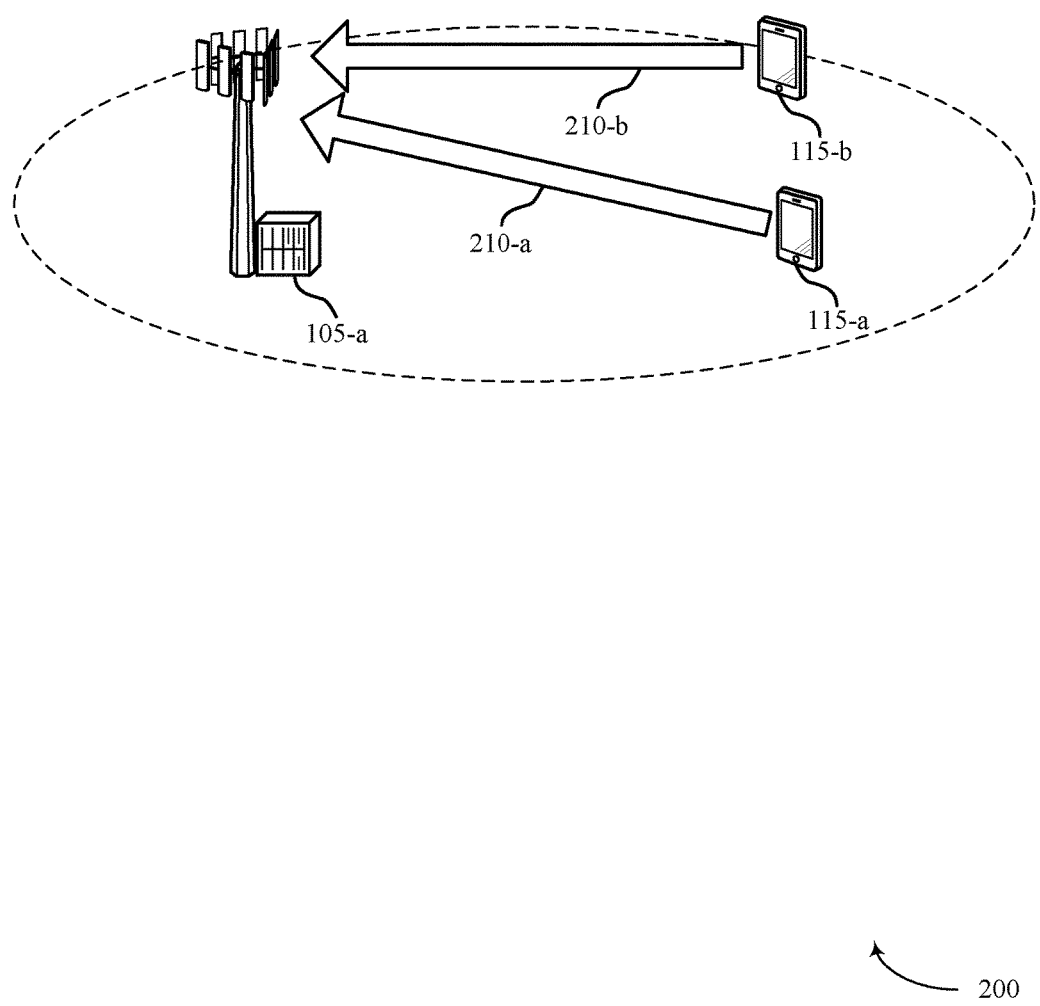
FIG. 2 illustrates an example of a wireless communications system that supports uplink control channel configurations for low latency communications in accordance with aspects of the present disclosure.

FIG. 2 illustrates an example of a wireless communications system 200 that supports an uplink control channel for low latency communications, in accordance with aspects of the present disclosure. Wireless communications system 200 may include base station 105-a and UEs 115-a and 115-b, which may be examples of the corresponding devices described with reference to FIG. 1. Wireless communications system 200 may support communication on UL control channels mapped to a set of REGs.

Wireless communications system 200 may use a reduced or variable TTI duration to reduce latency between DL and UL transmissions (i.e., low latency operation). In some cases, a low latency TTI may correspond to one LTE symbol period or approximately 71 μs for normal cyclic prefix (CP) and approximately 83 μs for extended CP. However, other TTI durations are possible (e.g., two LTE symbol periods, 1 slot, etc.).

Some wireless communications systems may use SC-FDMA for communications by multiple wireless devices. Additionally or alternatively, wireless communications system 200 may use OFDM or other multiplexing techniques. For example, multiple UEs 115, such as UE 115-a and UE 115-b, may transmit uplink control data using OFDM based on orthogonal subcarrier frequencies and symbol periods (e.g., the tone spacing may be inversely proportional to the symbol length). This may increase communication efficiency or reduce implementation costs in certain cases. For example, when a quantity of small cells found in a geographic region increases, the quantity of UEs 115 served by a given base station 105 may correspondingly decrease. Certain design characteristics and components of base stations 105 and UEs 115 may also be similar (e.g., due to services designed for device-to-device communication, vehicle-to-vehicle communication, etc.). Using common communication capabilities for base stations 105 and UEs 115 may support reduced implementation and operation costs.

Wireless communications system 200 may use OFDM-based low latency communication for UL transmission, which may coexist with other UL transmissions (e.g., traffic that includes a PUCCH, a physical uplink shared channel (PUSCH), a SRS, a physical random access channel (PRACH), etc.) in the same subframe or symbol period. While DL transmissions can utilize a cell specific reference signal (CRS) common to all UEs 115, a UL reference signal may be UE-specific. As a result, the UL RS may have aspects similar to those of a DL demodulation reference signal (DM-RS). UL transmissions may also have aspects similar to those of a CRS, where different UEs 115 (e.g., UE 115-a and UE 115-b) may have different frequency offsets, symbol period offsets, cyclic shifts, etc. In some cases, reference signals (RS) and data may be overlaid in the same modulation symbol.

In some cases, transmissions that contain PUCCH with CDM characteristics may be more efficient than transmission using FDM due to an amount of control data in DL transmissions. For example, in carrier aggregation (CA) and enhanced CA (eCA), which may use a large number of component carriers (CCs), the differences may become smaller based on the amount of control data used (e.g., in some cases CA transmissions may contain more UL control information). In some cases, SRS transmissions may also be used.

In one example, UL communication links (e.g., UL communication links 210-*a* and 210-*b*) may include a control channel that uses SC-FDMA, and data may be multiplexed using OFDM. This type of configuration may address link budget limitations, and may result in less resource fragmentation. Alternatively, a configuration based on OFDM may be used. In these cases, a RS design may have aspects similar to those of a CRS, where different UEs may be associated with different frequency offsets.

For example, the equation mod(C-RNTI, 3) may be used to determine a frequency offset based on a cell specific radio network temporary identity (C-RNTI) (e.g., using tow antennas). In some examples, the frequency offset can be configured or indicated based on the specific UE 115. A dynamic indication (e.g., in a downlink control channel) may support multiplexing of different UEs 115 in the same RB. The presence of RS design may also be determined based on a combination of semi-static and dynamic indications. For example, in symbols 0/4/7/11 of a given subframe, an RS may always be transmitted if UE 115-*a* or UE 115-*b* transmits PUCCH. If the first PUCCH transmission in a symbol is not 0/4/7/11, an RS may be determined based on other considerations. For instance, RS presence may be based on a fixed location, and subsequent occurrences of an RS may be mapped to resources based on a first occurrence of the RS.

Different UL channel configurations may be used when OFDM is employed for an UL control channel. In what may be referred to as Type 1 control channel, the UL control information may be mapped to REGs that are frequency distributed (i.e., having REs that are non-contiguous in the frequency domain) and use CDM. In some examples, a Type 1 control channel may be associated with relatively small payloads, and different UEs 115 may be multiplexed in the same RE.

In what may be referred to as a Type 2 control channel, the UL control information may be mapped to REGs within a CCE and may use FDM for multiple UEs. In some examples, Type 2 control channels may be associated with a medium or large payload, and different UEs 115 may not be multiplexed in the same RE (e.g., using CDM). In some cases, the operating environments for Type 1 control channels may be different than for Type 2 control channels.

With a Type 1 control channel used for UL communications, there may be CDM for RS REs, CDM for data REs (e.g., REs that include data or control information rather than reference signal), and frequency diversity. In one example, each REG may span six REs that consist of three RS REs and three data REs in an interleaved manner. In some examples, symbols may have RS or data, where symbols including data may be relatively more frequent in the event that a RS from an earlier symbol can be used for control data demodulation.

In some examples, a length-3 discrete Fourier transform (DFT) may be used for CDM operation. For example, three different sequences may be identified using the cover codes:

$[1, 1, 1]$, $[1, \exp(j*2*pi/3), \exp(j*4*pi/3)]$, and $\left[1, \exp\left(j*4*\frac{pi}{3}\right), \exp\left(j*2*\frac{pi}{3}\right)\right]$.

Individual UEs may determine one of the three sequences to use (e.g., based on the starting resource of a downlink control channel, a PDSCH block index, information fields in the control channel, etc.).

Each control channel may include a number of REGs (e.g., three or four), where the associated mapping of REs across RBs can be configured, indicated by base station 105-*a*, or dynamically determined. The RBs may be frequency distributed (e.g., non-contiguous in the frequency domain). For example, if a transmission includes a one-bit scheduling request (SR), there may be radio resource control (RRC) configured resources. Additionally or alternately, if a hybrid automatic repeat request (HARD) acknowledgment (ACK) is included, the resources may be dynamically determined based on a PDCCH or PDSCH, or both).

In Type 1 control channel designs, either one symbol or more than one symbol may be used for the control channel transmissions. When using a one-symbol control channel, the control channel may span four RBs in a symbol period, where each RB includes one REG that contains RS REs and data REs that are interleaved in the frequency domain. A second symbol period that follows the symbol period of the control channel may also span four RBs, each with one REG of data only, where the RS located in the first symbol period may be used for demodulation of the second symbol period. For the second symbol period, the length-3 DFT can be used (for three interleaved REs) or, alternatively, an orthogonal sequence of length 6 may be used. In examples where two symbol periods are used, each symbol period may span two RBs in each symbol period, each symbol period with one REG. In some examples, there may be more time-diversity using two symbol periods as compared to control channels using a single symbol period.

In some cases, UL REG configurations may be UE-specific and may be different from a DL REG. For example, some REGs may have three RS REs and three data REs (e.g., REs carrying control information or data) for an REG in a symbol period. But another UE 115 may have an REG with six control REs or six data REs in the same symbol period (but in different REs). That is, in some examples, a first UE 115-*a* may have an REG with six control data REs in a RB in a symbol period, while a second UE 115-*b* may have an REG with three RS REs and three control data REs in the same RB of the same symbol period.

In another configuration (i.e., a Type 2), control channels used for UL communications may be based on FDM. Type 2 channels may be configured for frequency diversity and based on aligned REG sizes (e.g., REG sizes being aligned with other control channels). In some examples of Type 2 channels, each REG may include six REs, including two RS REs and four data REs in an interleaved manner. The configuration of Type 2 control channels maybe different from Type 1 control channels discussed above, or may incorporate similar aspects of the Type 1 design.

In some examples, transmitted symbols may have either a RS or data, or both, where data may be more numerous in cases where a RS from an earlier symbol period can be used for control data demodulation. Each control channel may have one or more CCE, each including three or four REGs, where the RB locations may be configured or indicated, and may be frequency distributed. For example, if one CCE is used, three REGs may allow for 12 control data REs per CCE, and up to 18 REGs may be used if each REG has six control data REs. Alternatively, if one CCE is used, three REGs may allow for 16 control data REs per CCE, and up to 24 REGs may be possible if each REG has six control data REs.

As an example of the RS per REG configuration for Type 2 control channels, there may be RS REs and data REs interleaved in the frequency domain as mentioned above; but in some cases there may be two RS REs and four data REs within the REG, where one CCE may have three REGs when using one symbol control channels. In the first symbol period, three RBs may be used, each with one REG containing interleaved RS and data. The second symbol period may include three RBs, each with one REG containing data, which can utilize RSs of the previous symbol period for demodulation. In some cases, different RS patterns may be used (e.g., instead of a sequence of one RS RE, followed by two data REs, followed by one RS RE, followed by two data REs (i.e., "RDDRDD") in an REG, a sequence of one RS RE, followed by four data REs, followed by one RS RE (i.e., "RDDDDR") in an REG may be employed). When two or more symbol periods are used for the control channel, for example, its REGs may be identified from different symbol periods for increased time diversity.

In some cases, the CCE mapping for the control channel may be semi-statically configured, dynamically determined or indicated, or a combination of both. CCE location may further depend on the combinations of uplink control information (UCI) transmitted on the control channel. In some cases, for channel state information (CSI) or scheduling request (SR) feedback, the CCE can be indicated via an RRC configuration. For hybrid automatic HARQ feedback, dynamic indication/determination may be used, which may be linked with PDCCH or PDSCH, or both. In some examples, the number of CCEs can be semi-statically configured or dynamically derived and there may be a dependence on combinations of UCI and the respective payload size.

In some cases, when UE 115 has two or more transmit antennas, an antenna selection, switching, or diversity-based operation may be used. For example, a UE 115 may pick the best antenna for an REG such as REG 2 for the first antenna, and then REG 1 and REG 3 to the second antenna. The UE 115 may also alternate the transmit port across REGs. Alternatively, the second transmit port may be associated with another set of REGs, which may be similar to spatial orthogonal resource transmit diversity (SORTD).

In some examples, a control channel may be transmitted using a waveform other than an OFDM waveform. That is, the Type 1 or Type 2 control channel designs may, for example, more efficiently use multi-cluster discrete Fourier transform spread OFDMA (DFT-S-OFDM) or interleaved frequency division multiplexing (IFDM) for an improved peak to average power ratio (PAPR), and thus, better link efficiency. As a result, there may be a multi-cluster/IFDM-based control channel as opposed to an OFDM-based control channel for a UE 115.

In some cases, the UL data channel design may determine RS placement. The placement may be similar to the RS design for OFDM-based control channel for some low latency PUSCH configurations. Low latency PUSCH may be referred to as uPUSCH and low latency PUCCH may be referred to as uPUCCH. The RS for uPUCCH and uPUSCH may be shared, such as in rank 1 uPUSCH transmissions. The RS density (e.g., spatial density, time density, or frequency density) can also be different from that of PUCCH, and CDM operation in time-domain may be necessary for higher rank uPUSCH transmissions. In some cases, resource assignment can still be RB-based, where the DL resource allocation types may be readily re-used. However, the maximum bandwidth for uPUSCH can be different from the maximum possible UL bandwidth where some RBs can be reserved for non-low latency (e.g., legacy) PUCCH operation.

In some cases, the last symbol in a subframe may be reserved for a sounding reference signal (SRS) if the subframe is a cell-specific SRS subframe. To coexist with some wireless systems, there may be support for two types of SRS. An RS for uPUCCH and uPUSCH may be used for sounding and support of SRS in the last symbol. Additionally or alternatively, compatibility between low latency operations (e.g., uPUCCH configurations) and other system configuration may be maintained by leveraging configurations used for non-low latency communications. For instance, an existing (e.g., non-low latency) physical random access channel may be re-used.

Figure 3A:
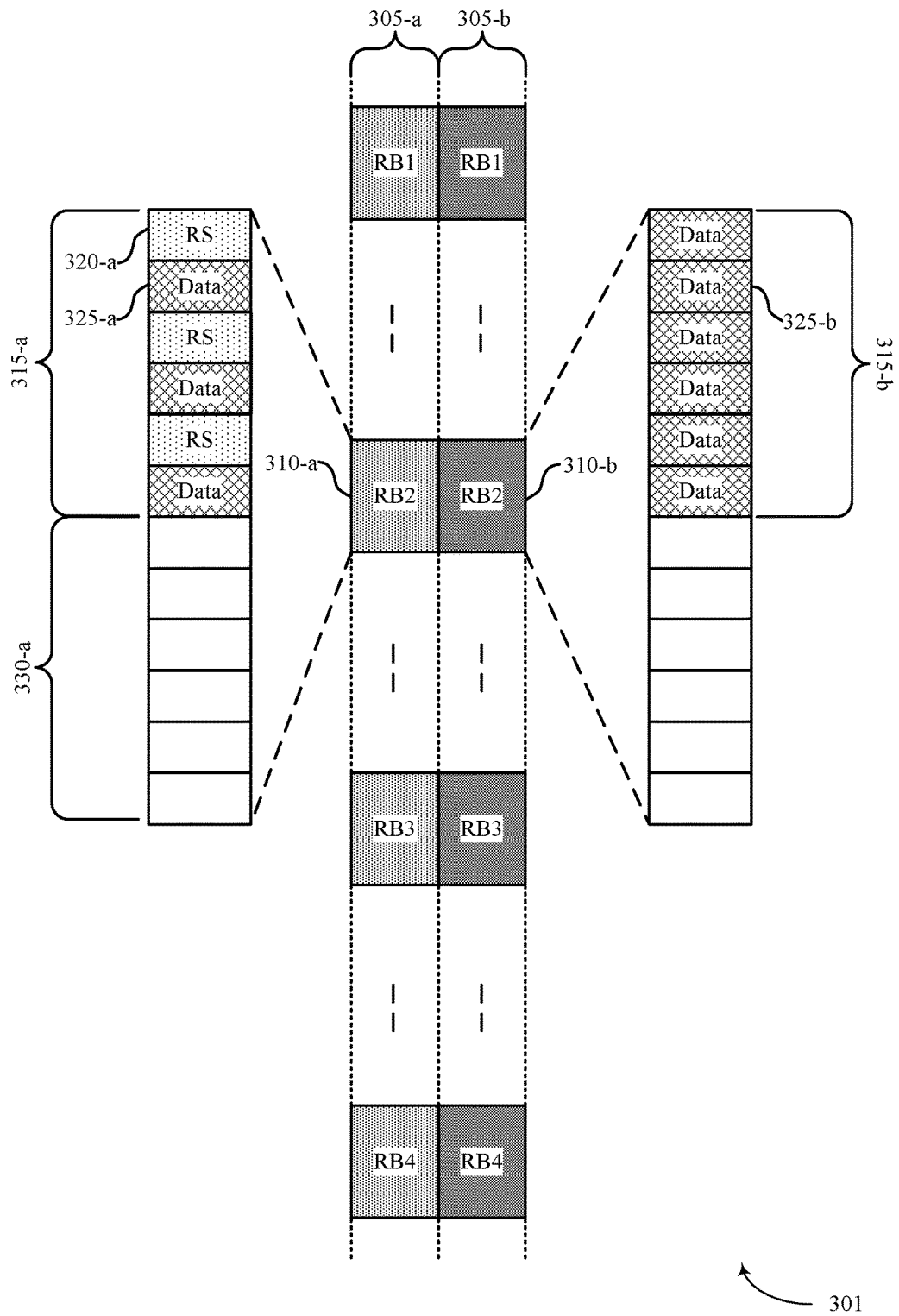
FIGS. 3A, 3B and 3C illustrate examples of uplink control channel configurations for low latency communications in accordance with aspects of the present disclosure.
Figure 3B:
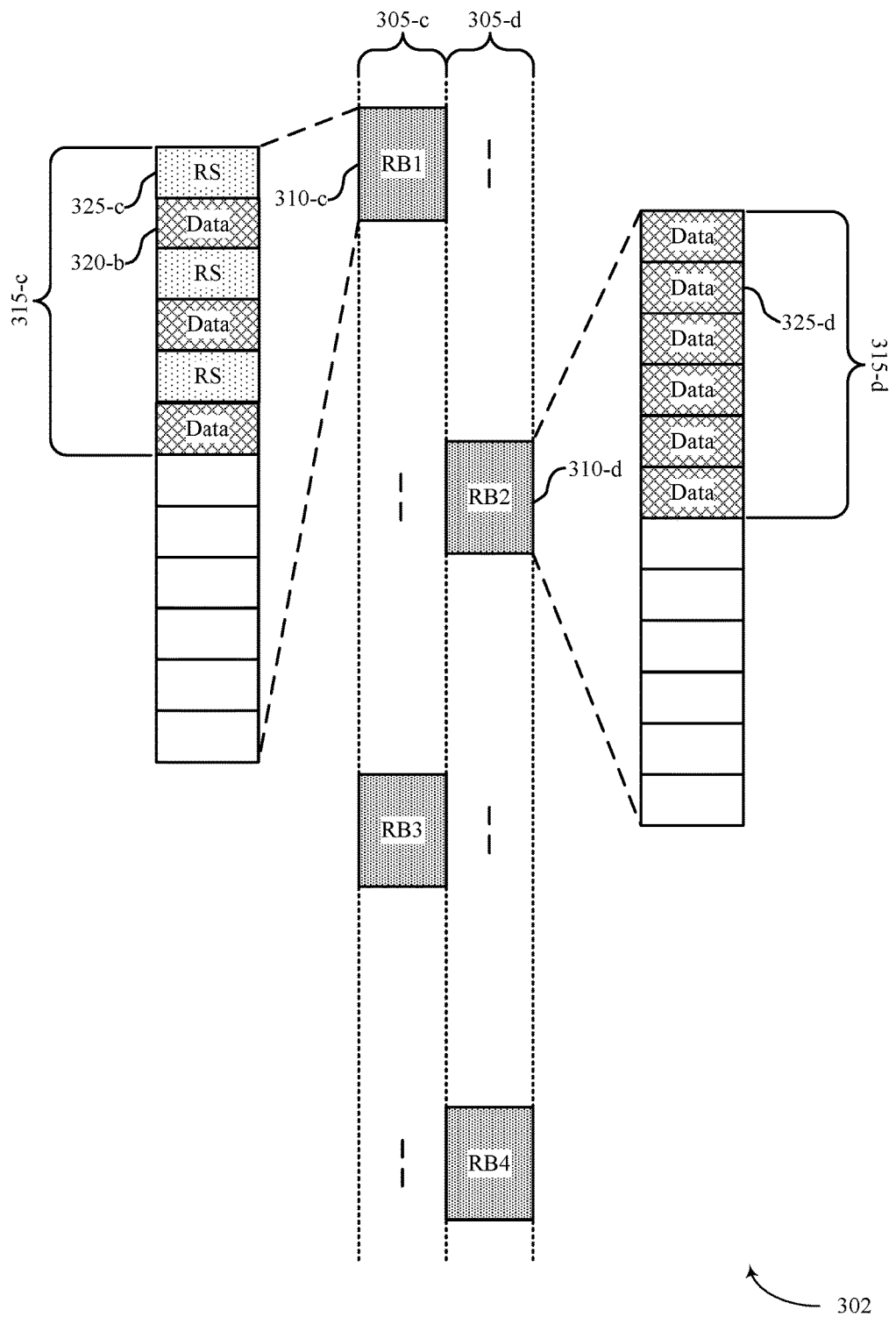
Figure 3C:
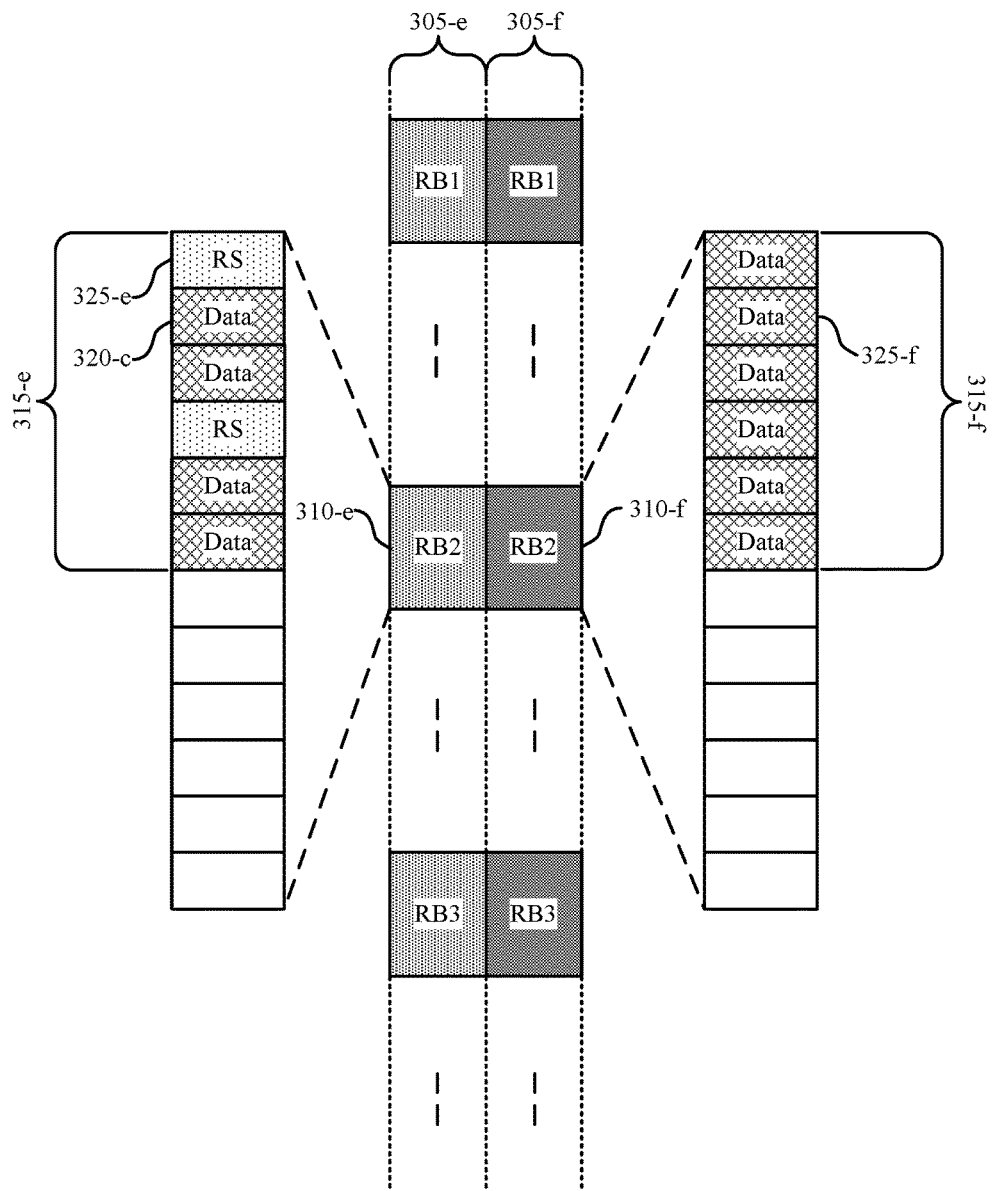

FIGS. 3A, 3B, and 3C illustrate examples of uplink control channel configurations 301, 302, and 303 for low latency communications. In some cases, uplink control channel configurations 301, 302, and 303 may represent aspects of techniques performed by a UE 115 or base station 105 as described with reference to FIGS. 1-2. FIGS. 3A-3C depict RB configurations for mapping uplink control channels to a set of REGs. The RB locations may be configured differently for different transmission techniques, such as with Type 1 or Type 2 control channels, as discussed above.

FIG. 3A illustrates an uplink control channel configuration 301 for a Type 1 control channel transmission. For example, an UL transmission during first symbol period 305-*a* may span four RBs 310 that are non-contiguous in the frequency domain, such as RB 310-*a*, where each RB may include one REG. That is, RB 310-*a* may include REG 315-*a*, including multiple REs within RB 310-*a* that are interleaved (e.g., in alternating subcarriers, etc.) with RS REs 320-*a*. In some cases, REG 315-*a* may contain six REs, including three RS REs 320-*a* and three data REs 325-*a*, where RS REs 320-*a* and data REs 325-*a* may be transmitted in an interleaved manner. A length-3 discrete Fourier transform (DFT) (or another DFT) may be used for CDM for multiplexing multiple UEs 115, where each UE 115 may determine a sequence to use based on DL PDSCH block index, information fields in PDCCH, and the like.

In some cases, REGs 315 of a second symbol period 305-*b* may include only RS REs or only data REs. For example, in second symbol period 305-*b* that includes four RBs 310-*b*, each RB 310-*b* may include an REG 315-*b* containing six data REs 325-*b*. In such cases, the RS(s) from an earlier symbol period (e.g., first symbol period 305-*a*) may be used for control data demodulation. In some examples, REG 315-*b* may include six RS REs. A length-3 DFT may be used for three interleaved REs, or alternatively, a new orthogonal sequence may be used. In some cases, a second portion 330 of RB 310-*a* may be used for transmissions from one or more different UEs 115.

FIG. 3B illustrates an uplink control channel configuration 302 for a two-symbol Type 1 control channel transmission, where each symbol period may include REs from two RBs 310. For example, RB 310-*c* within a first symbol period 305-*c* may include REG 315-*c* that contains three RS REs 320-*b* and three data REs 325-*c* that are interleaved in the frequency domain. A second symbol period 305-*d* may contain RB 310-*d* that includes six data REs 325-*d*, and as discussed above, a reference signal from an earlier symbol period (e.g., first symbol period 305-*c*) may be used for control demodulation. An REG may also include six RS REs, or a combination of RS REs and data REs. Two-symbol Type 1 control channel transmissions may be associated with relatively greater time diversity as compared to one-symbol Type 1 control channel transmissions.

FIG. 3C illustrates an uplink control channel configuration 303 for a one-symbol Type 2 control channel transmission. For example, first symbol period 305-*e* may contain three RBs 310-*e* that include an REG 315-*e*. REG 315-*e* may include RS REs 320-*c* and data REs 325-*e* that are interleaved in the frequency domain, where there are two RS REs 320-*c* per REG 315-*e*. In some examples, different RS RE and data RE patterns may be used in an REG 315-*e*. That is, an REG may contain REs following the pattern RDDDDR (where R indicates an RS RE and D indicates a data RE). REs may also be organized according to the pattern RDDRDD, or some other pattern.

A second symbol period 305-*f* may similarly include three RBs 310-*f* that include an REG 315-*f*. REG 315-*f* may contain data REs 325-*f*, or RS REs, or a combination of RS REs and data REs. In cases where only data REs 325-*f* are included then a reference signal from a previous symbol period (e.g., first symbol period 305-*e*) may be used for demodulation of the REs of the second symbol period 305-*f*. In some cases, when two or more symbol periods are used for the control channel communication, using REGs from different symbol periods may correspond to increased time diversity.

Figure 4:
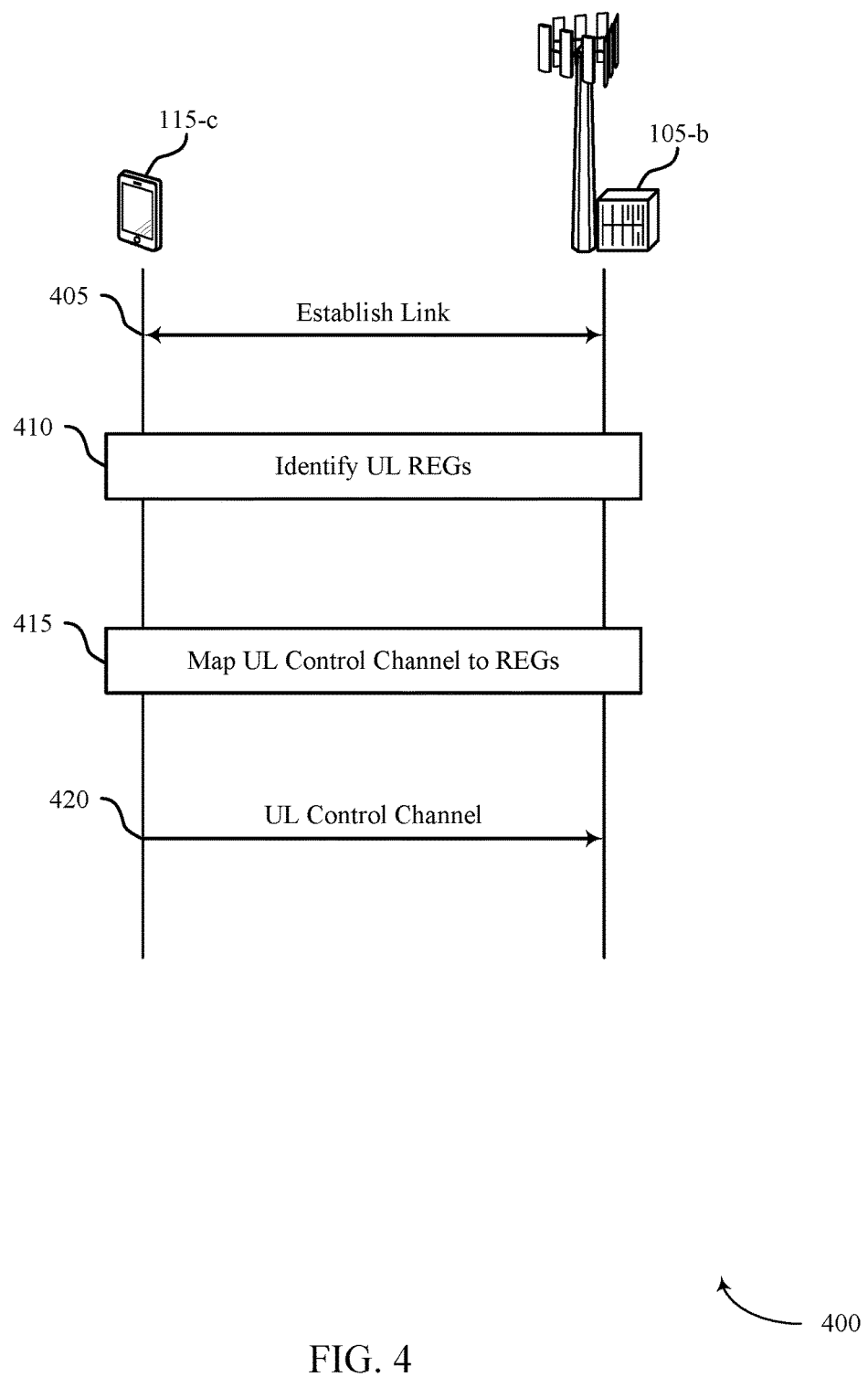
FIG. 4 illustrates an example of a process flow in a system that supports uplink control channel configurations for low latency communications in accordance with aspects of the present disclosure.

FIG. 4 illustrates an example of a process flow 400 for systems that support uplink control channel for low latency communications in accordance with various aspects of the present disclosure. Process flow 400 may include base station 105-*b* and UE 115-*c*, which may be examples of the corresponding devices described with reference to FIG. 1-2.

At 405, UE 115-*c* and base station 105-*b* may establish a wireless communication link (e.g., based on low latency operation, using a legacy PRACH procedure, or the like). The communication link may include both uplink and downlink communications. The uplink communications may include both user data and control data, which may also be referred to as control information.

At 410, UE 115-*c* and base station 105-*b* may identify a set of REGs for UL control transmissions, where each REG may include a portion of a different RB of a set of RBs (e.g., contiguous or non-contiguous RBs). In some cases, the set of REGs may be semi-statically configured using RRC signaling. In some cases, the set of REGs may be dynamically configured using an indication communicated in a downlink message. Each REG may include a set of REs that include data REs and RS REs that are interleaved in the frequency domain, where the interleaving may include alternating one or two of the control data REs with one of the RS REs. In some examples, UE 115-*c* and base station 105-*b* may identify an offset (e.g., a frequency offset, a symbol period offset, a cyclic shift, etc.), which may be applied to RS transmissions. The identified offset may be specifically associated with UE 115-*c*.

At 415, UE 115-*c* and base station 105-*b* may each map an uplink control channel for the wireless communication link to the set of REGs. In some cases UE 115-*c* and base station 105-*b* may determine a payload size of the uplink control channel and further identify a CDM cover code based on the payload size. In some examples, UE 115-*c* and base station 105-*b* may identify a quantity of REGs in the set of REGs based on a content of the uplink control channel.

At 420, UE 115-*c* may communicate with base station 105-*b* on the uplink control channel using the set of REGs. For example, UE 115-*c* may transmit the uplink control information to base station 105-*b*. In some cases, UE 115-*c* may also transmit an uplink RS using an identified offset in each RB of the set of RBs, where the uplink RS may be transmitted during symbol periods that include the uplink control channel at times indicated by base station 105-*b*. The uplink RS may be associated with the uplink control channel or an uplink shared channel, or both.

In some cases, communicating over the wireless communication link may be based on a CDM cover code. That is, multiple UEs 115 may be multiplexed in the UL control channel. In some examples, a waveform of the uplink control channel may include an OFDM waveform, a (discrete Fourier transform spread) DFT-S-OFDM waveform, or an interleaved frequency division multiplexing (IFDM) waveform.

In some examples, communicating on the uplink control channel includes transmitting an RS and data in a first REG of the set of REGs during a first symbol period and transmitting additional data in each RE of a second REG of the set of REGs during a second symbol period that follows the first symbol period. UE 115-*c* may identify a transmit antenna or a transmit port for each REG of the set of REGs and may also transmit a SRS during a last symbol period of a TTI that includes the uplink control channel.

Figure 5:
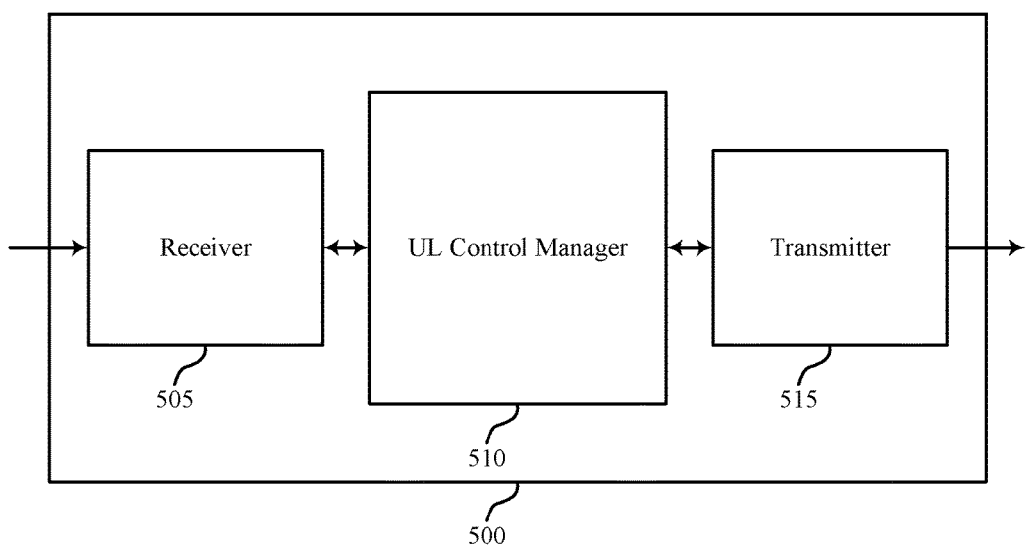
FIGS. 5 through 7 show block diagrams of a wireless device or devices that support uplink control channel configurations for low latency communications in accordance with aspects of the present disclosure.

FIG. 5 shows a block diagram of a wireless device 500 that supports uplink control channel for low latency communications in accordance with various aspects of the present disclosure. Wireless device 500 may be an example of aspects of a UE 115 or base station 105 described with reference to FIGS. 1, 2, and 4. Wireless device 500 may include receiver 505, UL control manager 510, and transmitter 515. Wireless device 500 may also include a processor. Each of these components may be in communication with one another.

The receiver 505 may receive information such as packets, user data, or control information associated with various information channels (e.g., control channels, data channels, and information related to uplink control channel for low latency communications, etc.). Information may be passed on to other components of the device. The receiver 505 may be an example of aspects of the transceiver 825 described with reference to FIG. 8 or the transceiver 925 described with reference to FIG. 9.

The UL control manager 510 may identify a set of REGs, where each REG of the set of REGs may include a portion of a respective RB of a set of RBs, map an uplink control channel for a wireless communication link to the set of REGs, and communicate (e.g., in cooperation with the receiver 505 and/or the transmitter 515) on the uplink control channel using the set of REGs. The UL control manager 510 may also be an example of aspects of the UL control manager 805 described with reference to FIG. 8 or the UL control manager 905 of FIG. 9. In some examples, the UL control manager 510 is an aspect of the processor 810 described with reference to FIG. 8 or the processor 910 described with reference to FIG. 9.

The transmitter 515 may transmit signals received from other components of wireless device 500. In some examples, the transmitter 515 may be collocated with a receiver in a transceiver module. For example, the transmitter 515 may be an example of aspects of the transceiver 825 described with reference to FIG. 8 or the transceiver 925 described with reference to FIG. 9. The transmitter 515 may include a single antenna, or it may include a plurality of antennas.

Figure 6:
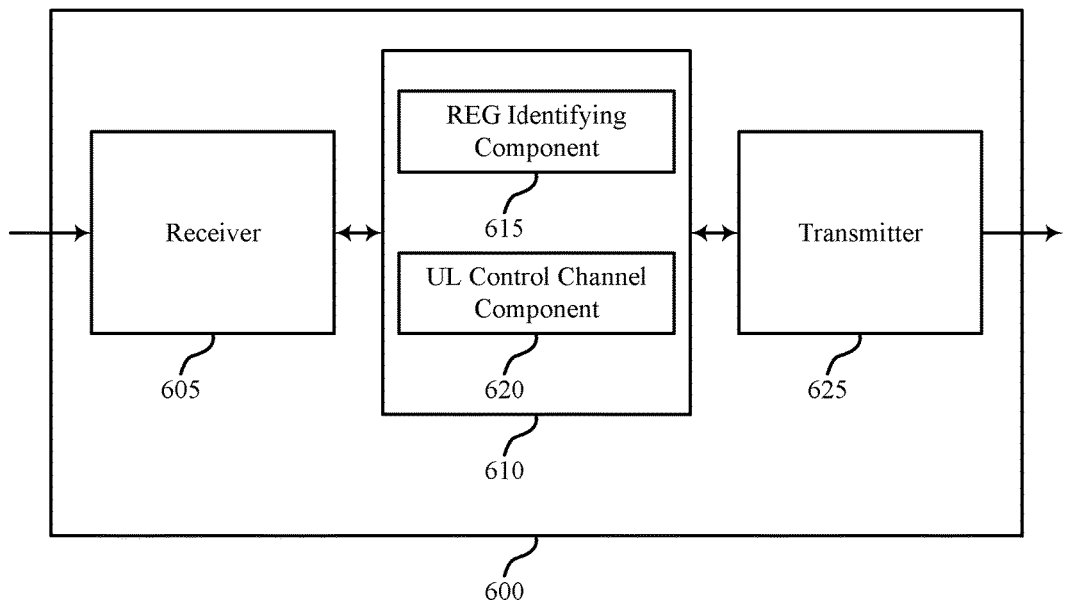

FIG. 6 shows a block diagram of a wireless device 600 that supports uplink control channel for low latency communications in accordance with various aspects of the present disclosure. Wireless device 600 may be an example of aspects of a wireless device 500 or a UE 115 or base station 105 described with reference to FIGS. 1, 2, 4, and 5. Wireless device 600 may include receiver 605, UL control manager 610, and transmitter 625. Wireless device 600 may also include a processor. Each of these components may be in communication with one another.

The receiver 605 may receive information which may be passed on to other components of the device. The receiver 605 may also perform the functions described with reference to the receiver 505 of FIG. 5. The receiver 605 may be an example of aspects of the transceiver 825 described with reference to FIG. 8 or the transceiver 925 described with reference to FIG. 9.

The UL control manager 610 may be an example of aspects of UL control manager 510 described with reference to FIG. 5. The UL control manager 610 may include REG identifying component 615 and UL control channel component 620. The UL control manager 610 may be an example of aspects of the UL control manager 805 described with reference to FIG. 8 or the UL control manager 905 of FIG. 9. In some examples, the UL control manager 510 is an aspect of the processor 810 described with reference to FIG. 8 or the processor 910 described with reference to FIG. 9.

The REG identifying component 615 may identify a quantity of REGs in the set of REGs based at least in part on a content of the uplink control channel, and identify a set of REGs, where each REG of the set of REGs may include a portion of a respective RB of a set of RBs. In some cases, the set of REGs is semi-statically configured according to an indication communicated using RRC signaling. In some cases, the set of REGs is dynamically configured using an indication communicated in a downlink message. Each REG of the set of REGs may include a set of REs that include data interleaved with REs that include a reference signal, where the interleaving may, in turn, include alternating one of the REs that include data with one of the REs that include the reference signal during a symbol period of an RB of the set of RBs.

In some cases, each REG of the set of REGs includes a set of REs that include data interleaved with REs that include a reference signal, where the interleaving includes alternating two of the REs that include data with one of the REs that include the reference signal during a symbol period of an RB of the set of RBs. In some cases, the set of RBs is non-contiguous.

The UL control channel component 620 may map an uplink control channel for a wireless communication link to the set of REGs and communicate (e.g., in cooperation with the receiver 605 and/or transmitter 625) on the uplink control channel using the set of REGs. In some cases, the communicating includes transmitting a reference signal and first data in a first REG of the set of REGs during a first symbol period and transmitting second data in each RE of a second REG of the set of REGs during a second symbol period that follows the first symbol period. In some cases, a waveform of the uplink control channel includes an OFDM waveform, a DFT-S-OFDM waveform, or an IFDM waveform.

The transmitter 625 may transmit signals received from other components of wireless device 600. In some examples, the transmitter 625 may be collocated with a receiver in a transceiver module. For example, the transmitter 625 may be an example of aspects of the transceiver 825 described with reference to FIG. 8 or the transceiver 925 described with reference to FIG. 9. The transmitter 625 may utilize a single antenna, or it may utilize a plurality of antennas.

Figure 7:
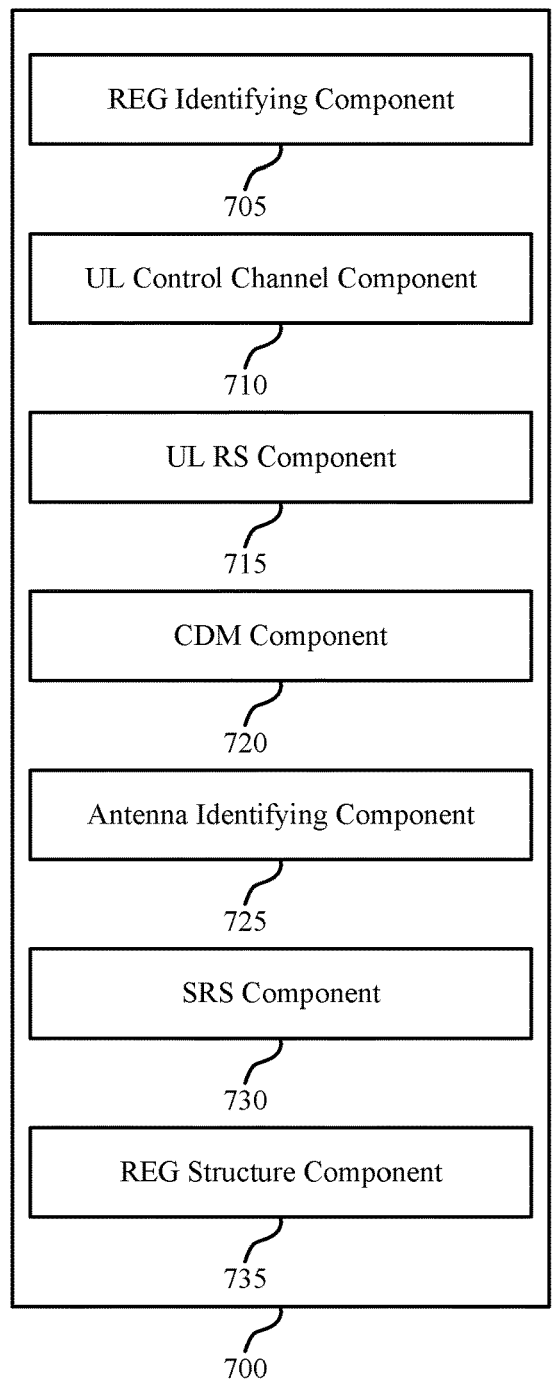

FIG. 7 shows a block diagram of a UL control manager 700, which may be an example of the corresponding component of wireless device 500 or wireless device 600. That is, UL control manager 700 may be an example of aspects of UL control manager 510 or UL control manager 610 described with reference to FIGS. 5 and 6. The UL control manager 700 may also be an example of aspects of the UL control manager 805 described with reference to FIG. 8 or the UL control manager 905 of FIG. 9. In some examples, the UL control manager 510 is an aspect of the processor 810 described with reference to FIG. 8 or the processor 910 described with reference to FIG. 9.

The UL control manager 700 may include REG identifying component 705, UL control channel component 710, UL RS component 715, CDM component 720, antenna identifying component 725, SRS component 730, and REG structure component 735. Each of these modules may communicate, directly or indirectly, with one another (e.g., via one or more buses).

The REG identifying component 705 may identify a quantity of REGs in a set of REGs based on a content of the uplink control channel, and identify a set of REGs, where each REG of the set of REGs includes a portion of a respective RB of a set of RBs.

The UL control channel component 710 may map an uplink control channel for a wireless communication link to the set of REGs, and communicate (e.g., in cooperation with a receiver 505 or 605 and/or transmitter 515 or 625) on the uplink control channel using the set of REGs. In some examples the UL control channel component may transmit data in each RE of an REG of the set of REGs, The UL RS component 715 may identify an offset associated with a UE, and, in combination with transmitter 515 or 625, for instance, transmit an uplink reference signal using the offset in each RB of the set of RBs. In some cases, the uplink reference signal is transmitted during symbol periods that include the uplink control channel. In some cases, the uplink reference signal is transmitted during symbol periods indicated by a base station. The uplink reference signal may be associated with the uplink control channel or an uplink shared channel, or both.

The CDM component 720 may identify a code division multiplexing (CDM) cover code, where communicating over the wireless communication link is based on the CDM cover code, and determine a payload size of the uplink control channel, where identifying the CDM cover code may be based on the payload size. In some examples the CDM cover code may include resource elements of two or more different subcarriers in the frequency domain, or resource elements of two or more different symbol periods in the time domain, or a combination thereof.

The antenna identifying component 725 may identify a transmit antenna or a transmit port (e.g., of a transmitter 515 or 625) for each REG of the set of REGs. The SRS component 730 may, in combination with transmitter 515 or 625, for instance, transmit a SRS during a last symbol period of a transmission time interval that includes the uplink control channel.

The REG structure component 735 may identify a first REG structure associated with a first UE and a second REG structure associated with a second UE, receive, in combination with receiver 505 or 605, for instance, a first uplink reference signal from the first UE using the first REG structure in an RB of the set of RBs, receive, in combination with receiver 505 or 605, a second uplink reference signal from the second UE using the second REG structure in an RB of a set of RBs, and receive, in combination with receiver 505 or 605, data or control information in each RE of an REG associated with the first UE in another RB during a second symbol duration. In some cases, the first REG structure and the second REG structure differ at least in one of a frequency offset, a number of REs for reference signals, or a CDM cover.

Figure 8:
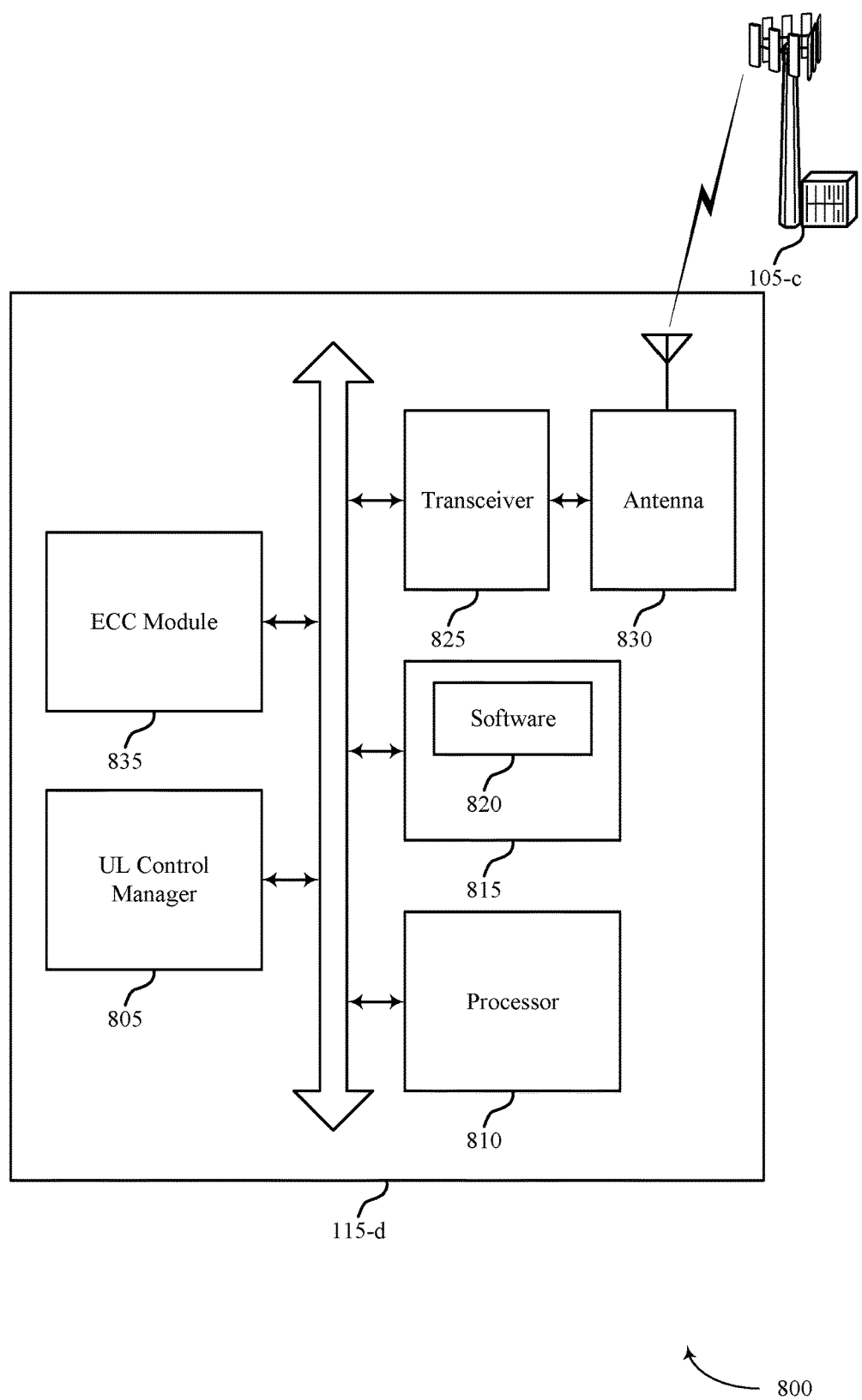
FIG. 8 illustrates a block diagram of a system including a UE that supports uplink control channel configurations for low latency communications in accordance with aspects of the present disclosure.

FIG. 8 shows a diagram of a system 800 including a device that supports uplink control channel for low latency communications in accordance with various aspects of the present disclosure. For example, system 800 may include UE 115-*d*, which may be an example of a wireless device 500, a wireless device 600, or a UE 115 as described with reference to FIGS. 1, 2, 4, and 5 through 7. UE 115-*d* may also include UL control manager 805, processor 810, memory 815, transceiver 825, antenna 830, and ECC module 835. Each of these modules may communicate, directly or indirectly, with one another (e.g., via one or more buses). The UL control manager 805 may be an example of an UL control manager 510, 610, or 700 as described with reference to FIGS. 5 through 7.

The processor 810 may include an intelligent hardware device, (e.g., a central processing unit (CPU), a microcontroller, an application specific integrated circuit (ASIC), etc.) The memory 815 may include random access memory (RAM) and read only memory (ROM). The memory 815 may store computer-readable, computer-executable software including instructions that, when executed, cause the processor, and thus UE 115-*d*, to perform various functions described herein (e.g., uplink control channel for low latency communications, etc.). In some cases, the software 820 may not be directly executable by the processor but may cause a computer (e.g., when compiled and executed) to perform functions described herein.

The transceiver 825 may communicate bi-directionally, via one or more antennas, wired, or wireless links, with one or more networks, as described above. For example, the transceiver 825 may communicate bi-directionally with a base station 105 (e.g., base station 105-*c*) or a UE 115. The transceiver 825 may also include a modem to modulate the packets and provide the modulated packets to the antennas for transmission, and to demodulate packets received from the antennas. In some cases, the wireless device may include a single antenna 830. However, in some cases the device may have more than one antenna 830, which may be capable of concurrently transmitting or receiving multiple wireless transmissions.

The ECC module 835 may enable operations using ECCs such as communication using shared or unlicensed spectrum, using reduced TTIs or subframe durations, or using a large number of component carriers.

Figure 9:
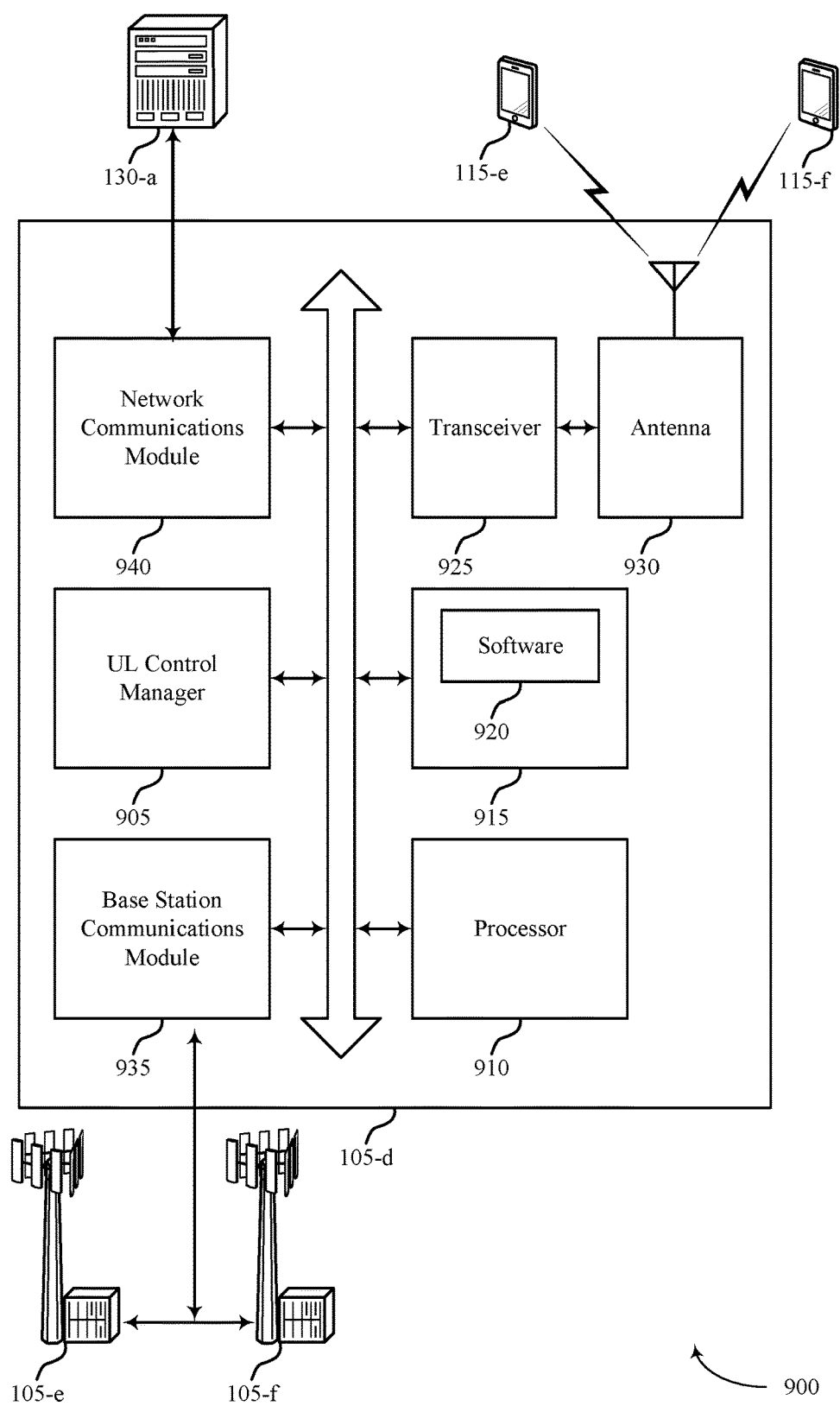
FIG. 9 illustrates a block diagram of a system including a base station that supports uplink control channel configurations for low latency communications in accordance with aspects of the present disclosure.

FIG. 9 shows a diagram of a wireless system 900 including a device that supports uplink control channel for low latency communications in accordance with various aspects of the present disclosure. For example, wireless system 900 may include base station 105-*d*, which may be an example of a wireless device 500, a wireless device 600, or a base station 105 as described with reference to FIGS. 1, 2, 4, and 5 through 7. Base station 105-*d* may also include components for bi-directional voice and data communications including components for transmitting communications and components for receiving communications. For example, base station 105-*d* may communicate bi-directionally with one or more UEs 115.

Base station 105-*d* may also include UL control manager 905, processor 910, memory 915, transceiver 925, antenna 930, base station communications module 935, and network communications module 940. Each of these modules may communicate, directly or indirectly, with one another (e.g., via one or more buses). The UL control manager 905 may be an example of a UL control manager as described with reference to FIGS. 5 through 7.

The processor 910 may include an intelligent hardware device, (e.g., a CPU, a microcontroller, an ASIC, etc.) The memory 915 may include RAM and ROM. The memory 915 may store computer-readable, computer-executable software including instructions that, when executed, cause the processor, and thus base station 105-*d*, to perform various functions described herein (e.g., uplink control channel for low latency communications, etc.). In some cases, the software 920 may not be directly executable by the processor but may cause a computer (e.g., when compiled and executed) to perform functions described herein.

The transceiver 925 may communicate bi-directionally, via one or more antennas, wired, or wireless links, with one or more networks, as described above. For example, the transceiver 925 may communicate bi-directionally with a base station 105 (e.g., base stations 105-*e* or 105-*f*) or a UE 115 (e.g., UEs 115-*e* or 115-*f*). The transceiver 925 may also include a modem to modulate the packets and provide the modulated packets to the antennas for transmission, and to demodulate packets received from the antennas. In some cases, the wireless device may include a single antenna 930. However, in some cases the device may have more than one antenna 830, which may be capable of concurrently transmitting or receiving multiple wireless transmissions.

The base station communications module 935 may manage communications with other base station 105 (e.g., base stations 105-*e* or 105-*f*), and may include a controller or scheduler for controlling communications with UEs 115 (e.g., UEs 115-*e* or 115-*f*) in cooperation with other base stations 105. For example, the base station communications module 935 may coordinate scheduling for transmissions to UEs 115 for various interference mitigation techniques such as beamforming or joint transmission. In some examples, base station communications module 935 may provide an X2 interface within an LTE/LTE-A wireless communication network technology to provide communication between base stations 105.

The network communications module 940 may manage communications with the core network (e.g., via one or more wired backhaul links). For example, the network communications module 940 may manage the transfer of data communications for client devices, such as one or more UEs 115.

Figure 10:
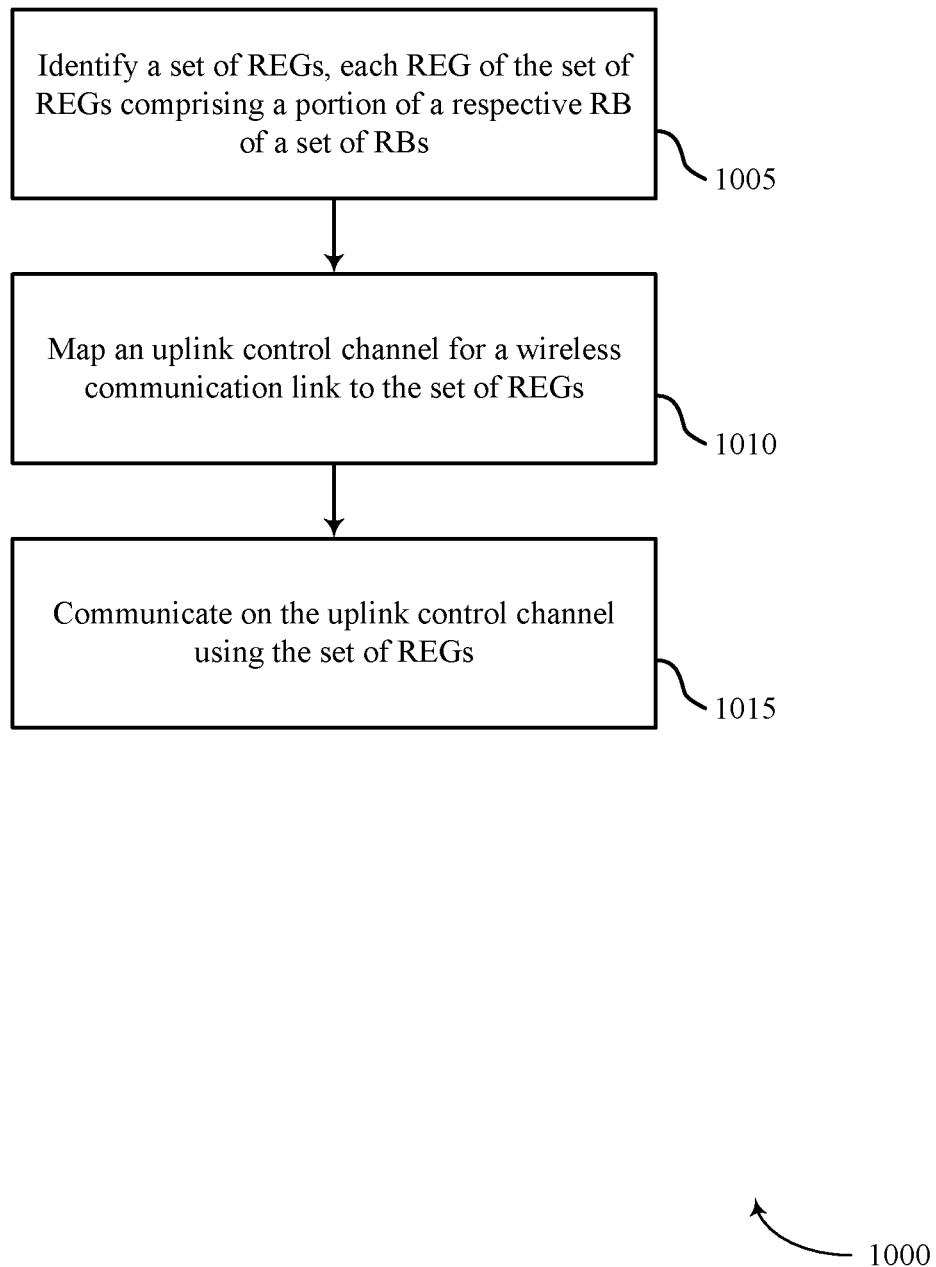
FIGS. 10 through 13 illustrate methods for uplink control channel configurations for low latency communications in accordance with aspects of the present disclosure.

FIG. 10 shows a flowchart illustrating a method 1000 for uplink control channel for low latency communications in accordance with various aspects of the present disclosure. The operations of method 1000 may be implemented by a UE 115 or base station 105 or its components as described with reference to FIG. 1, 2, 4, 8, or 9. For example, the operations of method 1000 may be performed by the UL control manager as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 1005, the UE 115 or base station 105 may identify a set of REGs, where each REG of the set of REGs includes a portion of a respective RB of a set of RBs as described above with reference to FIGS. 2 through 4. In certain examples, the operations of block 1005 may be performed by the REG identifying component 615 or 705 as described with reference to FIGS. 6 and 7. In some examples, the operations of block 1005 may be performed by the processor 810 or 910 as described with reference to FIGS. 8 and 9.

At block 1010, the UE 115 or base station 105 may map an uplink control channel for a wireless communication link to the set of REGs as described above with reference to FIGS. 2 through 4. In certain examples, the operations of block 1010 may be performed by the UL control channel component as described with reference to FIGS. 6 and 7. In some examples, the operations of block 1010 may be performed by the processor 810 or 910 as described with reference to FIGS. 8 and 9.

At block 1015, the UE 115 or base station 105 may communicate on the uplink control channel using the set of REGs as described above with reference to FIGS. 2 through 4. In certain examples, the operations of block 1015 may be performed by the UL control channel component as described with reference to FIGS. 6 and 7. In some examples, the operations of block 1015 may be performed by the transceiver 825 or 925 as described with reference to FIGS. 8 and 9.

Figure 11:
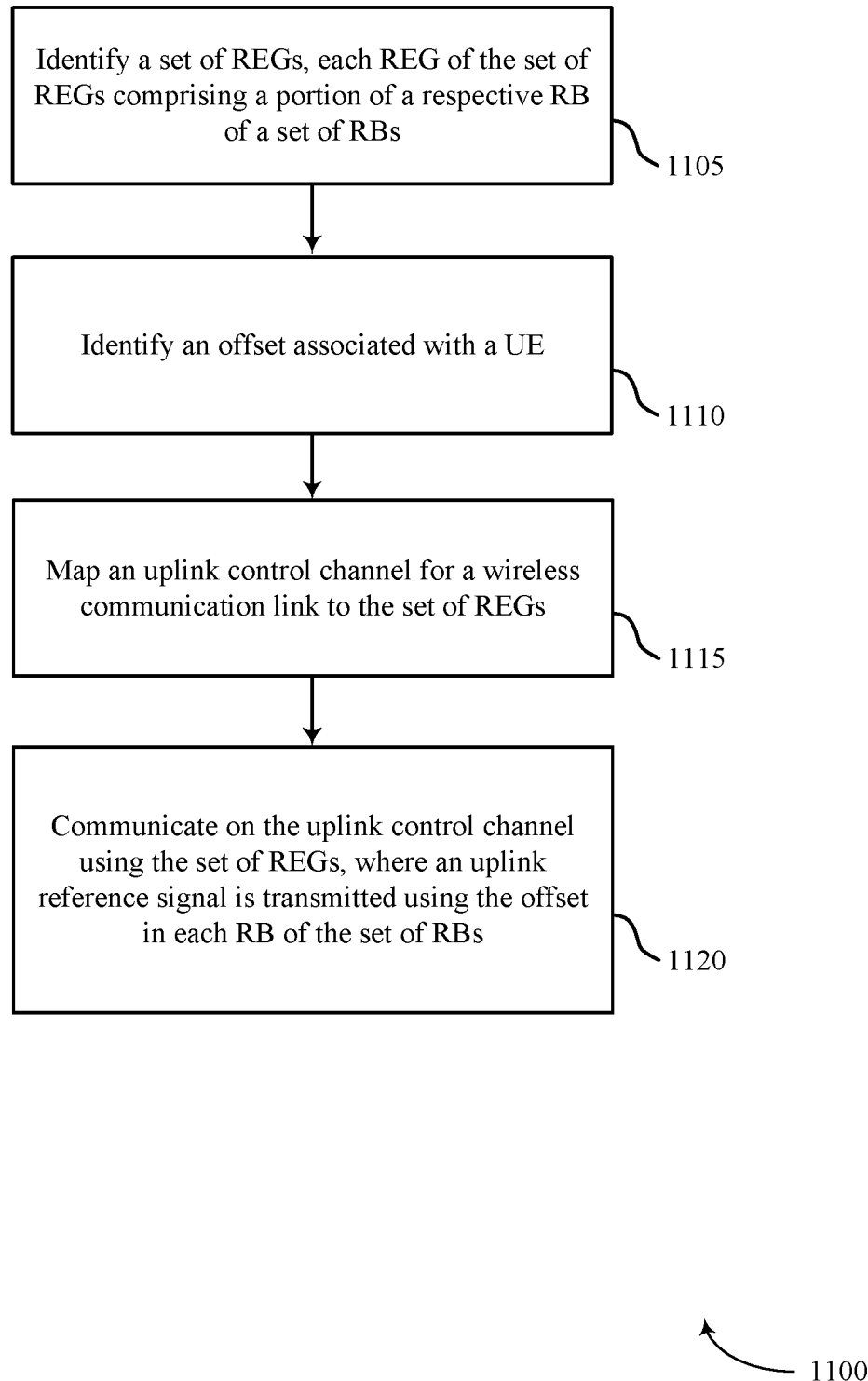

FIG. 11 shows a flowchart illustrating a method 1100 for uplink control channel for low latency communications in accordance with various aspects of the present disclosure. The operations of method 1100 may be implemented by a UE 115 or base station 105 or its components as described with reference to FIG. 1, 2, 4, 8, or 9. For example, the operations of method 1100 may be performed by the UL control manager as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 1105, the UE 115 or base station 105 may identify a set of REGs, where each REG of the set of REGs includes a portion of a respective RB of a set of RBs as described above with reference to FIGS. 2 through 4. In certain examples, the operations of block 1105 may be performed by the REG identifying component as described with reference to FIGS. 6 and 7. In some examples, the operations of block 1105 may be performed by the processor 810 or 910 as described with reference to FIGS. 8 and 9.

At block 1110, the UE 115 or base station 105 may identify an offset associated with a UE as described above with reference to FIGS. 2 through 4. In certain examples, the operations of block 1110 may be performed by the UL RS component as described with reference to FIGS. 6 and 7. In some examples, the operations of block 1110 may be performed by the processor 810 or 910 as described with reference to FIGS. 8 and 9.

At block 1115, the UE 115 or base station 105 may map an uplink control channel for a wireless communication link to the set of REGs as described above with reference to FIGS. 2 through 4. In certain examples, the operations of block 1115 may be performed by the UL control channel component as described with reference to FIGS. 6 and 7. In some examples, the operations of block 1115 may be performed by the processor 810 or 910 as described with reference to FIGS. 8 and 9.

At block 1120, the UE 115 or base station 105 may communicate on the uplink control channel using the set of REGs, where an uplink reference signal is transmitted using the offset in each RB of the set of non-contiguous RBs is transmitted over symbol periods of the uplink control channel, as described above with reference to FIGS. 2 through 4. In certain examples, the operations of block 1120 may be performed by the UL control channel component as described with reference to FIGS. 6 and 7. In some examples, the operations of block 1120 may be performed by the transceiver 825 or 925 as described with reference to FIGS. 8 and 9.

Figure 12:
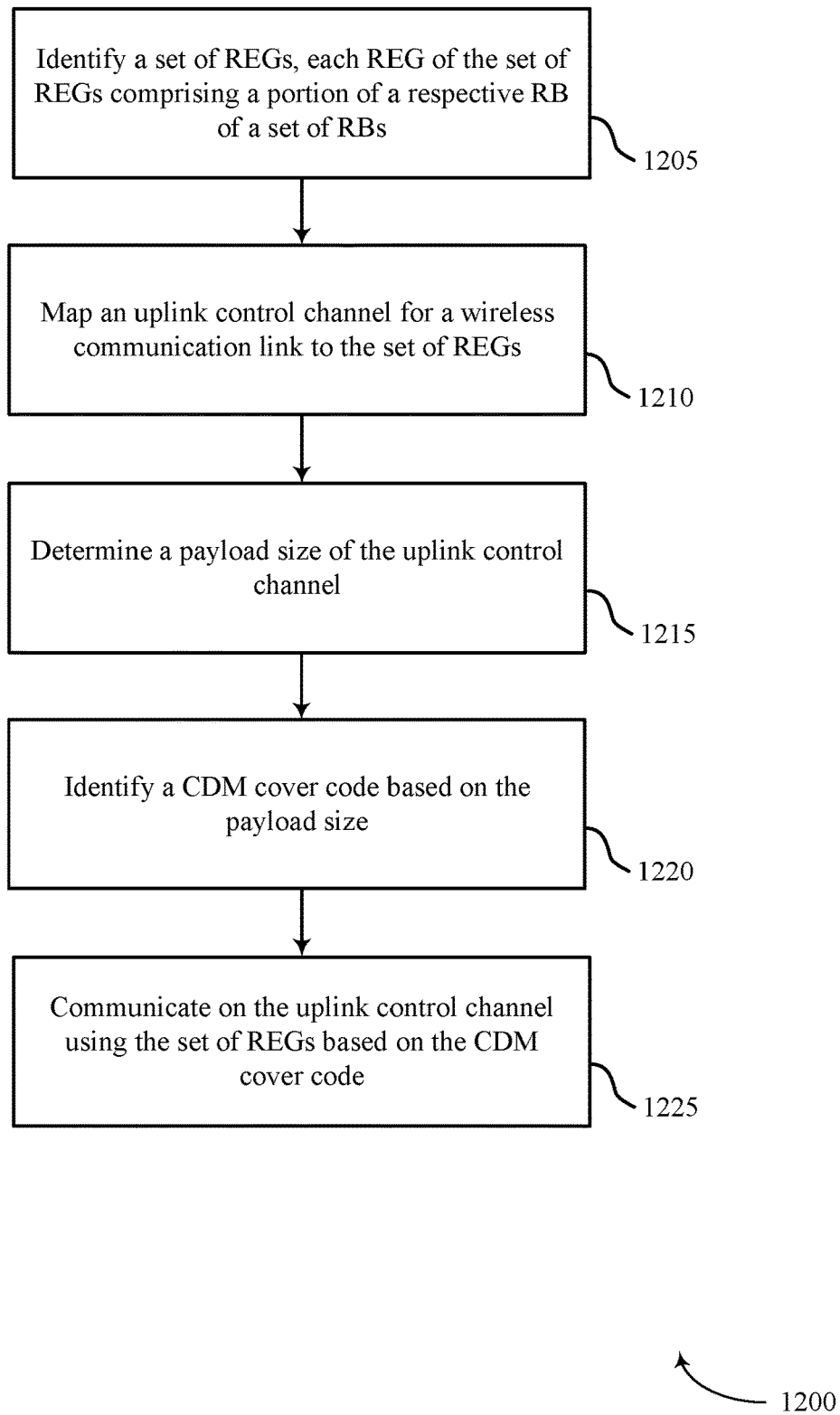

FIG. 12 shows a flowchart illustrating a method 1200 for uplink control channel for low latency communications in accordance with various aspects of the present disclosure. The operations of method 1200 may be implemented by a UE 115 or base station 105 or its components as described with reference to FIG. 1, 2, 4, 8, or 9. For example, the operations of method 1200 may be performed by the UL control manager as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 1205, the UE 115 or base station 105 may identify a set of REGs, where each REG of the set of REGs includes a portion of a respective RB of a set of RBs as described above with reference to FIGS. 2 through 4. In certain examples, the operations of block 1205 may be performed by the REG identifying component as described with reference to FIGS. 6 and 7. In some examples, the operations of block 1205 may be performed by the processor 810 or 910 as described with reference to FIGS. 8 and 9.

At block 1210, the UE 115 or base station 105 may map an uplink control channel for a wireless communication link to the set of REGs as described above with reference to FIGS. 2 through 4. In certain examples, the operations of block 1210 may be performed by the UL control channel component as described with reference to FIGS. 6 and 7. In some examples, the operations of block 1210 may be performed by the processor 810 or 910 as described with reference to FIGS. 8 and 9.

At block 1215, the UE 115 or base station 105 may determine a payload size of the uplink control channel as described above with reference to FIGS. 2 through 4. In certain examples, the operations of block 1215 may be performed by the CDM component as described with reference to FIGS. 6 and 7. In some examples, the operations of block 1215 may be performed by the processor 810 or 910 as described with reference to FIGS. 8 and 9.

At block 1220, the UE 115 or base station 105 may identify a code division multiplexing (CDM) cover code, where identifying the CDM cover code is based on the payload size as described above with reference to FIGS. 2 through 4. In certain examples, the operations of block 1220 may be performed by the CDM component as described with reference to FIGS. 6 and 7. In some examples, the operations of block 1220 may be performed by the processor 810 or 910 as described with reference to FIGS. 8 and 9.

At block 1225, the UE 115 or base station 105 may communicate on the uplink control channel using the set of REGs, where communicating over the wireless communication link is based on the CDM cover code as described above with reference to FIGS. 2 through 4. In certain examples, the operations of block 1225 may be performed by the UL control channel component as described with reference to FIGS. 6 and 7. In some examples, the operations of block 1225 may be performed by the transceiver 825 or 925 as described with reference to FIGS. 8 and 9.

Figure 13:
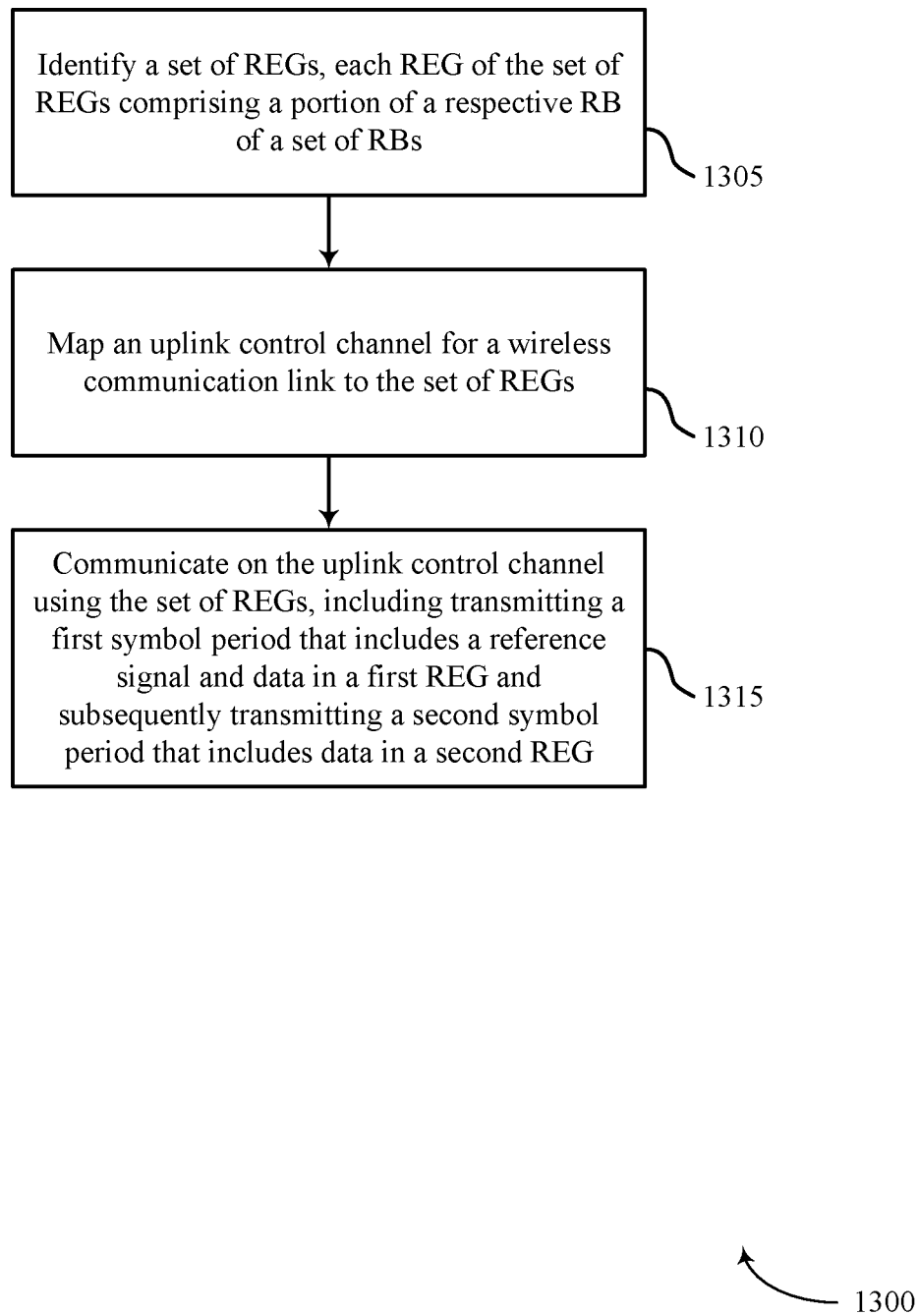

FIG. 13 shows a flowchart illustrating a method 1300 for uplink control channel for low latency communications in accordance with various aspects of the present disclosure. The operations of method 1300 may be implemented by a UE 115 or base station 105 or its components as described with reference to FIG. 1, 2, 4, 8, or 9. For example, the operations of method 1300 may be performed by the UL control manager as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 1305, the UE 115 or base station 105 may identify a set of REGs, where each REG of the set of REGs includes a portion of a respective RB of a set of RBs as described above with reference to FIGS. 2 through 4. In certain examples, the operations of block 1305 may be performed by the REG identifying component as described with reference to FIGS. 6 and 7. In some examples, the operations of block 1305 may be performed by the processor 810 or 910 as described with reference to FIGS. 8 and 9.

At block 1310, the UE 115 or base station 105 may map an uplink control channel for a wireless communication link to the set of REGs as described above with reference to FIGS. 2 through 4. In certain examples, the operations of block 1310 may be performed by the UL control channel component as described with reference to FIGS. 6 and 7. In some examples, the operations of block 1310 may be performed by the processor 810 or 910 as described with reference to FIGS. 8 and 9.

At block 1315, the UE 115 or base station 105 may communicate on the uplink control channel using the set of REGs, where communicating over the wireless communication link includes transmitting a reference signal and first data in a first REG of the set of REGs during a first symbol period, and transmitting second data in each RE of a second REG of the set of REGs during a second symbol period that follows the first symbol period as described above with reference to FIGS. 2 through 4. In certain examples, the operations of block 1315 may be performed by the UL control channel component as described with reference to FIGS. 6 and 7. In some examples, the operations of block 1315 may be performed by the transceiver 825 or 925 as described with reference to FIGS. 8 and 9.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for uplink control channel for low latency communications.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc where disks usually reproduce data magnetically, while discs reproduce data optically with lasers. Combinations of the above are also included within the scope of computer-readable media.

Techniques described herein may be used for various wireless communications systems such as code division multiple access (CDMA), time division multiple access (TDMA), frequency division multiple access (FDMA) (FDMA), orthogonal frequency division multiple access (OFDMA) (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), Institute of Electrical and Electronics Engineers (IEEE) 802.11 (wireless fidelity (Wi-Fi)), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "Third Generation Partnership Project" (3GPP). CDMA2000 and UMB are described in documents from an organization named "Third Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base station of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for uplink control channel for low latency communications. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a DSP, an ASIC, a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

What is claimed is:

1. A method of wireless communication comprising:
    identifying a set of uplink resource elements (REs) that span, in a frequency domain, a portion of a respective resource block (RB) of a set of RBs, wherein the portion of the respective RB is less than all REs in the respective RB;
    identifying an offset associated with a user equipment (UE);
    mapping uplink control information for a wireless communication link to the set of uplink REs;
    communicating the uplink control information using the set of uplink REs; and
    transmitting an uplink reference signal using the offset in each RB of the set of RBs, wherein the uplink reference signal is transmitted during one or more symbol periods that comprise the uplink control information.

2. The method of claim 1, wherein the set of RBs comprises a plurality of RBs during a transmission time interval (TTI) that are non-contiguous in the frequency domain during the TTI.

3. The method of claim 1, wherein the uplink reference signal is transmitted during one or more symbol periods indicated by a base station.

4. The method of claim 1, wherein the uplink reference signal is associated with the uplink control information or uplink shared channel information, or both.

5. The method of claim 1, wherein the set of uplink REs is semi-statically configured according to an indication communicated using radio resource control (RRC) signaling.

6. The method of claim 1, wherein the set of uplink REs is dynamically configured using an indication communicated in a downlink message.

7. The method of claim 1, wherein a waveform of the uplink control information comprises an orthogonal frequency division multiplexing (OFDM) waveform.

8. The method of claim 1, further comprising:
    identifying a code division multiplexing (CDM) cover code, wherein communicating over the wireless communication link is based at least in part on the CDM cover code.

9. The method of claim 8, wherein the CDM cover code comprises resource elements of two or more different subcarriers in the frequency domain, or resource elements of two or more different symbol periods in a time domain, or a combination thereof.

10. The method of claim 8, further comprising:
    determining a payload size of the uplink control information, wherein identifying the CDM cover code is based at least in part on the payload size.

11. The method of claim 1, wherein the set of uplink REs includes REs that comprise data interleaved with REs that comprise a reference signal, wherein the interleaving comprises alternating, in the frequency domain, one of the REs that comprise data with one of the REs that comprise the reference signal during a symbol period of an RB of the set of RBs.

12. The method of claim 1, wherein the set of uplink REs includes REs that comprise data interleaved with REs that comprise a reference signal, wherein the interleaving comprises alternating, in the frequency domain, two of the REs that comprise data with one of the REs that comprise the reference signal during a symbol period of an RB of the set of RBs.

13. The method of claim 1, further comprising:
    identifying a quantity of uplink REs in the set of uplink REs based at least in part on a content of the uplink control information.

14. The method of claim 1, wherein the communicating comprises:
    transmitting a reference signal and first data in the set of uplink REs during a first symbol period.

15. The method of claim 1, further comprising:
    identifying a transmit antenna or a transmit port for each uplink RE of the set of uplink REs.

16. The method of claim 1, wherein the communicating comprises:
    transmitting a sounding reference signal (SRS) during a last symbol period of a transmission time interval that comprises the uplink control information.

17. The method of claim 1, further comprising:
    identifying a first RE structure associated with a first user equipment (UE) and a second RE structure associated with a second UE; and
    receiving a first uplink reference signal from the first UE using the first RE structure in an RB of the set of RBs.

18. The method of claim 17, further comprising:
    receiving a second uplink reference signal from the second UE using the second RE structure in another RB of a set of RBs.

19. The method of claim 18, wherein the first RE structure and the second RE structure differ at least in one of a frequency offset, a number of REs for reference signals, or a code division multiplexing (CDM) cover code, or a combination thereof.

20. The method of claim 17, further comprising:
    receiving data or control information in an uplink RE associated with the first UE in another RB during a second symbol period, the set of uplink REs comprising the uplink RE associated with the first UE.

21. An apparatus for wireless communication, comprising:
    a processor;
    memory in electronic communication with the processor; and
    instructions stored in the memory and operable, when executed by the processor, to cause the apparatus to:
    identify a set of uplink resource elements (REs) that span, in a frequency domain, a portion of a respective resource block (RB) of a set of RBs, wherein the portion of the respective RB is less than all REs in the respective RB;
    identify an offset associated with a user equipment (UE);

map uplink control information for a wireless communication link to the set of uplink REs;
communicate the uplink control information using the set of uplink REs; and
transmit an uplink reference signal using the offset in each RB of the set of RBs, wherein the uplink reference signal is transmitted during one or more symbol periods that comprise the uplink control information.

22. The apparatus of claim 21, wherein the set of uplink REs is semi-statically configured according to an indication communicated using radio resource control (RRC) signaling.

23. The apparatus of claim 21, wherein the set of uplink REs is dynamically configured using an indication communicated in a downlink message.

24. The apparatus of claim 21, wherein a waveform of the uplink control information comprises an orthogonal frequency division multiplexing (OFDM) waveform.

25. The apparatus of claim 21, further comprising instructions operable to cause the apparatus to:
identify a code division multiplexing (CDM) cover code, wherein communicating over the wireless communication link is based at least in part on the CDM cover code.

26. An apparatus for wireless communication comprising:
means for identifying a set of uplink resource elements (REs) that span, in a frequency domain, a portion of a respective resource block (RB) of a set of RBs, wherein the portion of the respective RB is less than all REs in the respective RB;
means for identifying an offset associated with a user equipment (UE);
means for mapping uplink control information for a wireless communication link to the set of uplink REs;
means for communicating the uplink control information using the set of uplink REs; and
means for transmitting an uplink reference signal using the offset in each RB of the set of RBs, wherein the uplink reference signal is transmitted during one or more symbol periods that comprise the uplink control information.

27. A non-transitory computer-readable medium storing code for wireless communication, the code comprising instructions executable by at least one processor, the at least one processor configured to:
identify a set of uplink resource elements (REs) that span, in a frequency domain, a portion of a respective resource block (RB) of a set of RBs, wherein the portion of the respective RB is less than all REs in the respective RB;
identify an offset associated with a user equipment (UE);
map uplink control information for a wireless communication link to the set of uplink REs;
communicate the uplink control information using the set of uplink REs; and
transmit an uplink reference signal using the offset in each RB of the set of RBs, wherein the uplink reference signal is transmitted during one or more symbol periods that comprise the uplink control information.

* * * * *